US010956719B2

(12) United States Patent
Cheng et al.

(10) Patent No.: US 10,956,719 B2
(45) Date of Patent: Mar. 23, 2021

(54) DEPTH IMAGE BASED FACE ANTI-SPOOFING

(71) Applicant: QUALCOMM Incorporated, San Diego, CA (US)

(72) Inventors: Ke-Li Cheng, San Diego, CA (US); Kuang-Man Huang, Taipei (TW); Michel Adib Sarkis, San Diego, CA (US); Yingyong Qi, San Diego, CA (US); Ning Bi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 81 days.

(21) Appl. No.: 16/206,832

(22) Filed: Nov. 30, 2018

(65) Prior Publication Data

US 2020/0175260 A1   Jun. 4, 2020

(51) Int. Cl.
*G06K 9/00* (2006.01)
*G06K 9/66* (2006.01)
*G06T 19/20* (2011.01)
*G06T 7/50* (2017.01)

(52) U.S. Cl.
CPC ..... *G06K 9/00288* (2013.01); *G06K 9/00899* (2013.01); *G06K 9/66* (2013.01); *G06T 7/50* (2017.01); *G06T 19/20* (2013.01)

(58) Field of Classification Search
CPC .. G06K 9/00288; G06K 9/00899; G06K 9/66; G06T 7/50; G06T 19/20
USPC ................ 382/118, 154, 106, 103, 173, 282
See application file for complete search history.

(56) References Cited

U.S. PATENT DOCUMENTS

| | | | | |
|---|---|---|---|---|
| 6,466,685 B1* | 10/2002 | Fukui | ................ | G06K 9/00288 382/115 |
| 7,353,994 B2* | 4/2008 | Farrall | ..................... | G06K 7/12 235/454 |
| 7,835,547 B2* | 11/2010 | Kawata | ................ | G06K 9/6271 382/115 |
| 8,620,024 B2* | 12/2013 | Huang | ................... | G06F 3/017 348/169 |
| 9,025,022 B2* | 5/2015 | Huang | .............. | G06K 9/00335 341/20 |
| 9,183,429 B2* | 11/2015 | Qi | ...................... | G06K 9/00221 |
| 9,237,379 B2* | 1/2016 | Lee | .................... | G06K 9/00771 |
| 9,684,964 B2* | 6/2017 | Nakatani | ................. | G06T 7/593 |
| 9,767,348 B2* | 9/2017 | Klare | ...................... | G06F 16/51 |
| 9,865,062 B2* | 1/2018 | Sundaresan | ............... | G06T 7/20 |
| 9,886,769 B1* | 2/2018 | Tremaine | ............ | G06K 9/0063 |
| 9,918,662 B2* | 3/2018 | Breitner | ................ | A61B 5/1116 |
| 10,043,102 B1* | 8/2018 | Goenka | ............... | G06F 16/2379 |
| 10,282,431 B1* | 5/2019 | Bhotika | ............. | G06F 16/5838 |
| 10,572,988 B1* | 2/2020 | Chaturvedi | ........ | G06Q 30/0643 |

(Continued)

*Primary Examiner* — Marceau Milord
(74) *Attorney, Agent, or Firm* — Holland & Hart LLP

(57) ABSTRACT

Methods, systems, and devices for image processing are described. The method may include identifying a face in a first image based on identifying one or more biometric features of the face, determining an angular direction of one or more pixels of the identified face, identifying an anchor point on the identified face, sorting each of one or more pixels of the identified face into one of a set of pixel bins based on a combination of the determined angular direction of the pixel and a distance between the pixel and the identified anchor point, and outputting an indication of authenticity associated with the face based on a number of pixels in each bin.

18 Claims, 15 Drawing Sheets

(56) References Cited

U.S. PATENT DOCUMENTS

| | | | | |
|---|---|---|---|---|
| 2002/0047853 A1* | 4/2002 | Bartell | .................. | B82Y 15/00 345/651 |
| 2007/0258644 A1* | 11/2007 | Kawahara | .............. | G06K 9/627 382/181 |
| 2008/0317350 A1* | 12/2008 | Yamaguchi | .......... | G06K 9/6247 382/190 |
| 2008/0317357 A1* | 12/2008 | Steinberg | ................ | G06T 5/003 382/209 |
| 2010/0111370 A1* | 5/2010 | Black | ................ | G06K 9/00369 382/111 |
| 2010/0303354 A1* | 12/2010 | Reznik | ................. | G06K 9/4642 382/168 |
| 2011/0013845 A1* | 1/2011 | Tu | ........................ | G06K 9/6215 382/218 |
| 2011/0103695 A1* | 5/2011 | Sato | .................... | G06K 9/4604 382/190 |
| 2012/0027290 A1* | 2/2012 | Baheti | .................. | G06K 9/4671 382/154 |
| 2012/0213422 A1* | 8/2012 | Niskanen | ............ | G06K 9/00228 382/118 |
| 2013/0294642 A1* | 11/2013 | Wang | .................. | G06K 9/00261 382/103 |
| 2016/0070952 A1* | 3/2016 | Kim | ................... | G06K 9/00288 382/118 |
| 2016/0086051 A1* | 3/2016 | Piekniewski | ........ | G06K 9/4652 382/103 |
| 2017/0083762 A1* | 3/2017 | Segalovitz | ......... | G06K 9/00463 |
| 2018/0068414 A1* | 3/2018 | Savvides | ................ | G06T 17/20 |
| 2018/0121713 A1* | 5/2018 | Guo | ......................... | H04N 1/00 |
| 2018/0139431 A1* | 5/2018 | Simek | ................... | H04N 13/254 |
| 2019/0043208 A1* | 2/2019 | Piekniewski | ............ | G06T 3/00 |
| 2019/0088004 A1* | 3/2019 | Lucas | .................... | G06T 7/194 |
| 2019/0220653 A1* | 7/2019 | Wang | ................. | G06K 9/00288 |
| 2019/0266738 A1* | 8/2019 | Kim | ................... | G06K 9/00248 |
| 2020/0042685 A1* | 2/2020 | Tussy | ..................... | G06F 21/32 |
| 2020/0126239 A1* | 4/2020 | Qian | ..................... | B64D 47/08 |
| 2020/0257869 A1* | 8/2020 | Powell | ................. | G06K 7/1413 |

* cited by examiner

DEPTH IMAGE BASED FACE ANTI-SPOOFING

BACKGROUND

The following relates generally to object recognition, and more specifically to anti-spoofing in facial recognition.

Object recognition may refer to a field of computer vision for finding and identifying objects in an image or video sequence. As an example of object recognition, facial recognition may refer to a process used to identify or verify a person (e.g., from a digital image, a frame of a video clip, etc.) based on one or more facial features. Generally, facial features may be extracted from the image and compared with features stored in a database. Additionally or alternatively, the extracted facial features may be fed to a classifier, which may in turn generate an identity hypothesis based on the input features. Facial recognition may involve one or more steps including face detection, face tracking, facial landmark detection, face normalization, feature extraction, identification/verification, or a combination thereof. In some cases, facial recognition may be based at least in part on processing the digital image or video frame using machine learning.

Generally, machine learning may refer to a class of artificial neural networks in which the connectivity pattern between nodes of the neural network resembles that of neurons in various biological processes. Machine learning for facial recognition may be computationally complex, utilizing large amounts of memory, processing, power, time, etc. There currently exist a variety of portable computing devices, such as portable wireless telephones, personal digital assistants (PDAs), laptop computers, tablet personal computers, eBook viewers, and the like. More specifically, some of these devices may include digital imaging sensors for taking photos (and video) as well as components for communicating voice and data packets over wired or wireless networks (e.g., for downloading videos and images). Such devices may benefit from improved facial recognition techniques (e.g., to identify and prevent spoofing in facial recognition; to reduce memory requirements, processing load, power consumption, time, etc.).

SUMMARY

The described techniques relate to improved methods, systems, devices, and apparatuses that support depth image based face anti-spoofing. Generally, the described techniques provide for training a machine learning model to recognize images of actual faces and images and faked or spoofed faces, analyzing one or more input depth images, and determining whether each of the analyzed one or more input depth images contain an image of an actual face or an image of a fake face.

A method of image processing at a device is described. The method may include identifying a face in a first image based on identifying one or more biometric features of the face, determining an angular direction of one or more pixels of the identified face, identifying an anchor point on the identified face, sorting each of one or more pixels of the identified face into one of a set of pixel bins based on a combination of the determined angular direction of the pixel and a distance between the pixel and the identified anchor point, and outputting an indication of authenticity associated with the face based on a number of pixels in each bin.

An apparatus for image processing at a device is described. The apparatus may include a processor, memory in electronic communication with the processor, and instructions stored in the memory. The instructions may be executable by the processor to cause the apparatus to identify a face in a first image based on identifying one or more biometric features of the face, determine an angular direction of one or more pixels of the identified face, identify an anchor point on the identified face, sort each of one or more pixels of the identified face into one of a set of pixel bins based on a combination of the determined angular direction of the pixel and a distance between the pixel and the identified anchor point, and output an indication of authenticity associated with the face based on a number of pixels in each bin.

Another apparatus for image processing at a device is described. The apparatus may include means for identifying a face in a first image based on identifying one or more biometric features of the face, determining an angular direction of one or more pixels of the identified face, identifying an anchor point on the identified face, sorting each of one or more pixels of the identified face into one of a set of pixel bins based on a combination of the determined angular direction of the pixel and a distance between the pixel and the identified anchor point, and outputting an indication of authenticity associated with the face based on a number of pixels in each bin.

A non-transitory computer-readable medium storing code for image processing at a device is described. The code may include instructions executable by a processor to identify a face in a first image based on identifying one or more biometric features of the face, determine an angular direction of one or more pixels of the identified face, identify an anchor point on the identified face, sort each of one or more pixels of the identified face into one of a set of pixel bins based on a combination of the determined angular direction of the pixel and a distance between the pixel and the identified anchor point, and output an indication of authenticity associated with the face based on a number of pixels in each bin.

Some examples of the method, apparatuses, and non-transitory computer-readable medium described herein may further include operations, features, means, or instructions for determining an angular position of the identified face in a three dimensional space, the first image including three dimensional image data, and moving the face in the three dimensional space until the anchor point may be pointed in a predetermined direction in the three dimensional space.

Some examples of the method, apparatuses, and non-transitory computer-readable medium described herein may further include operations, features, means, or instructions for determining a depth of the face in the three dimensional space may be not at a predetermined depth, and adjusting the depth of the face in the three dimensional space to be at the predetermined depth.

Some examples of the method, apparatuses, and non-transitory computer-readable medium described herein may further include operations, features, means, or instructions for augmenting a database of face image samples by making at least one copy of the first image, adjusting one or more aspects of the face in the at least one copy of the first image, and adding the adjusted copy of the first image to the database.

Some examples of the method, apparatuses, and non-transitory computer-readable medium described herein may further include operations, features, means, or instructions for moving the face in the at least one copy in three-dimensional space a predetermined distance away from or toward a point of view of a depth camera that captured the first image.

Some examples of the method, apparatuses, and non-transitory computer-readable medium described herein may further include operations, features, means, or instructions for adding a predetermined amount of Gaussian noise to at least one pixel of the face in the at least one copy.

Some examples of the method, apparatuses, and non-transitory computer-readable medium described herein may further include operations, features, means, or instructions for generating one or more patches, each patch including at least one black pixel, and placing at least one of the one or more patches randomly or in a predetermined location over a portion of the face in the at least one copy.

Some examples of the method, apparatuses, and non-transitory computer-readable medium described herein may further include operations, features, means, or instructions for making the at least one copy of the first image and adjusting the one or more aspects of the face in the at least one copy of the first image when the face in the first image may be determined to be an unauthentic face.

Some examples of the method, apparatuses, and non-transitory computer-readable medium described herein may further include operations, features, means, or instructions for training a machine learning model to distinguish between unauthentic face images and authentic face images, and receiving a second image of a face in three dimensional space.

Some examples of the method, apparatuses, and non-transitory computer-readable medium described herein may further include operations, features, means, or instructions for analyzing the second image by feeding the second image into the machine learning model, and determining whether the face in the second image may be an authentic face or an unauthentic face based on the training of the machine learning model.

In some examples of the method, apparatuses, and non-transitory computer-readable medium described herein, the anchor point includes at least one of an identified feature of the face in the image, the feature including at least one of a nose, an eye, an eyebrow, a lip, a chin, a cheek, an ear, a forehead, or any combination thereof.

A method of image processing is described. The method may include selecting an anchor point on a three-dimensional image of a face, rotating the anchor point to align in a predetermined direction in three-dimensional space, generating on a two-dimensional plane a grid of vertices with a set resolution between each vertex, orthogonally projecting each 3D point of the three-dimensional image of the face onto the two-dimensional plane, each vertex being located within a triangle formed by the 3D points, and interpolating a depth value for each vertex of the grid based on computing one or more barycentric coordinates from each triangle enclosing a vertex from the grid of vertices.

An apparatus for image processing is described. The apparatus may include a processor, memory in electronic communication with the processor, and instructions stored in the memory. The instructions may be executable by the processor to cause the apparatus to select an anchor point on a three-dimensional image of a face, rotate the anchor point to align in a predetermined direction in three-dimensional space, generate on a two-dimensional plane a grid of vertices with a set resolution between each vertex, orthogonally project each 3D point of the three-dimensional image of the face onto the two-dimensional plane, each vertex being located within a triangle formed by the 3D points, and interpolate a depth value for each vertex of the grid based on computing one or more barycentric coordinates from each triangle enclosing a vertex from the grid of vertices.

Another apparatus for image processing is described. The apparatus may include means for selecting an anchor point on a three-dimensional image of a face, rotating the anchor point to align in a predetermined direction in three-dimensional space, generating on a two-dimensional plane a grid of vertices with a set resolution between each vertex, orthogonally projecting each 3D point of the three-dimensional image of the face onto the two-dimensional plane, each vertex being located within a triangle formed by the 3D points, and interpolating a depth value for each vertex of the grid based on computing one or more barycentric coordinates from each triangle enclosing a vertex from the grid of vertices.

A non-transitory computer-readable medium storing code for image processing is described. The code may include instructions executable by a processor to select an anchor point on a three-dimensional image of a face, rotate the anchor point to align in a predetermined direction in three-dimensional space, generate on a two-dimensional plane a grid of vertices with a set resolution between each vertex, orthogonally project each 3D point of the three-dimensional image of the face onto the two-dimensional plane, each vertex being located within a triangle formed by the 3D points, and interpolate a depth value for each vertex of the grid based on computing one or more barycentric coordinates from each triangle enclosing a vertex from the grid of vertices.

DETAILED DESCRIPTION

Figure 1:
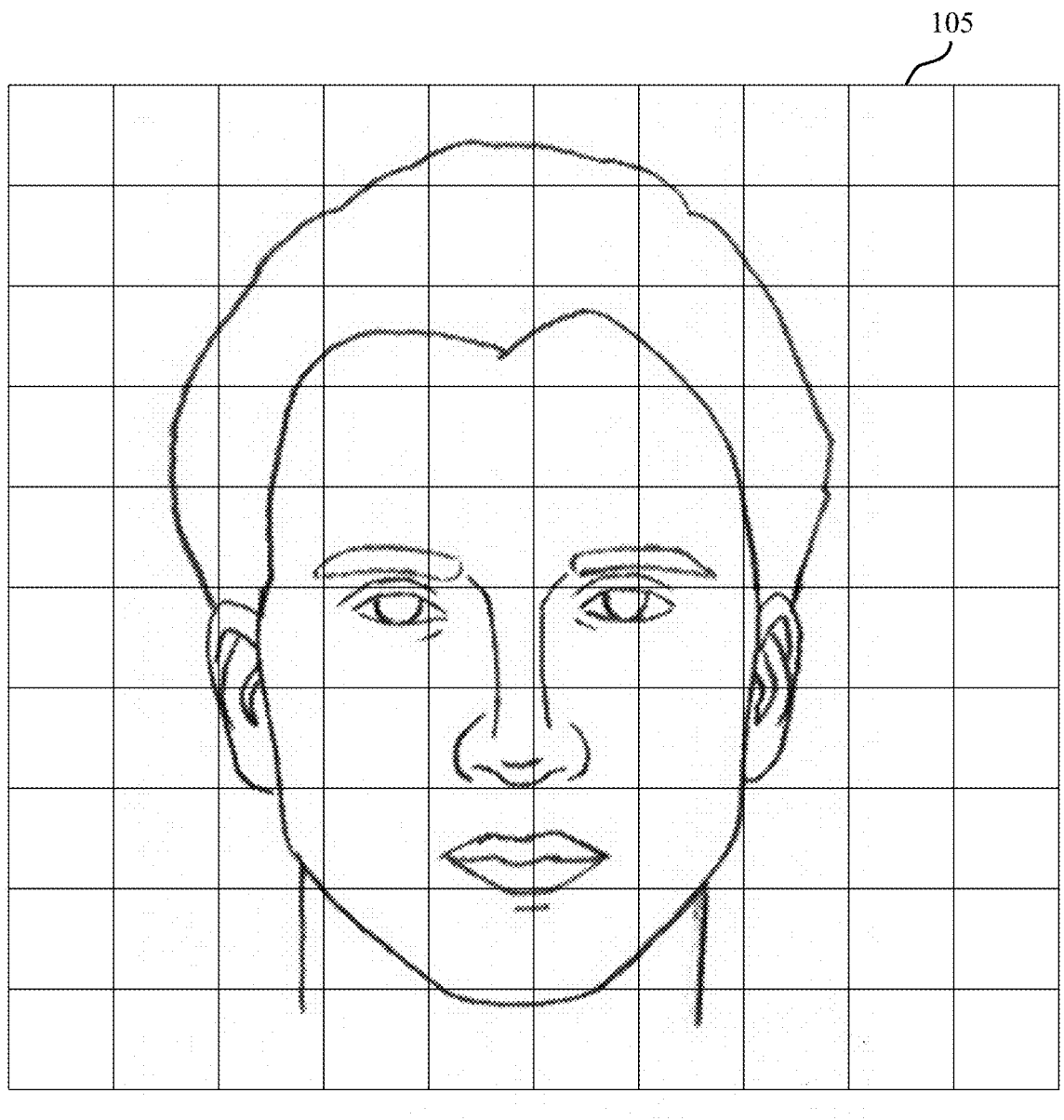
FIG. 1 illustrates an example of a system for image processing that supports depth image based face anti-spoofing in accordance with aspects of the present disclosure.

Computer devices may include facial authentication systems. In some cases, a facial authentication system may include cameras configured to capture one or more images of a user's face and grant device access based on analysis of the captured image, where device access may include access to a user account on the device, full access to the device (e.g., root access, etc.), access to an application on the device, access to a website account from a browser on the device, etc. However, in some cases, the facial authentication system may be spoofed using a fake image of a face (e.g., a printed image of a face, an image of a face displayed on a monitor, etc.). In some cases, successfully spoofing the facial authentication system may result in granting device access to a person not authorized for the device access.

Object recognition refers to a field of computer vision for finding and identifying objects in an image or video sequence. Though aspects of the following are described in the context of facial recognition, it is to be understood that the described techniques may be extended to recognition of other objects in an image (e.g., animals, inanimate objects, etc.) without deviating from the scope of the present disclosure. Facial recognition refers to the process of identifying or verifying a person from a digital image or video frame. For example, facial recognition may compare selected facial features from the image to a face database. In some examples, facial recognition may be achieved based at least in part on processing an input depth image using machine learning. The machine learning of the present techniques may include training a neural network to distinguish between unauthentic face images (e.g., images of spoofed faces) and authentic face images (e.g., images of actual faces).

Given an input depth image, the present techniques determine whether the image is an image of a real face or an image of an artificial object attempting to spoof the system (e.g., an image of a printed image of a face, etc.). However, the problem of learning a robust face feature representation from a depth image is a challenging task. Firstly, it is common for a depth image to have relatively significant amounts of noise and holes on a depth image even using the latest mobile depth sensors. Also, slight variations in head poses and/or distances between head and camera may lead to significant changes in the appearance of the measured face depth image.

To implement a robust solution for face authentication, it is important that an anti-spoofing system for facial detection and authentication determines whether the captured face image belongs to real person or to an artificial product. One of the inputs for the system may be an image obtained by a camera (e.g., RGB monochrome camera, near-infrared camera, etc.). In some cases, a camera may capture limited information such as just the reflectance and/or illuminance of an object. In contrast, an image of an object captured by a 3D depth camera may capture the geometry of the object from the obtained depth image. Such geometric patterns may be more discriminative in differentiating a real face from a fake face in many scenarios. For example, a printed face picture (e.g., an image of a face printed on a piece of paper) is relatively easy to distinguish from the depth image as the printed face picture has minor geometric information as compared to a real face. However, conventional systems that implement a 3D depth camera may still be spoofed. For example, placing a finger in front of a printed face picture may spoof a conventional system.

The present techniques avoid the deficiencies of conventional facial recognition systems by improving facial detection and authentication. The present techniques include a low complexity framework for face anti-spoofing using depth images. The present techniques introduce depth feature representation referred to as an Angular Spherical Face Representation (ASFR), a feature descriptor to represent the face or object geometry; a machine learning algorithms (e.g. deep neural network (DNN)) that uses ASFR as input to determine whether an image of a face is authentic; a face normalization method to avert sensor deficiencies; and a data augmentation process to increase the amount of data used in training. The present techniques validate the effectiveness of ASFR with various machine leaning algorithms (e.g., DNN anti-spoofing). It is noted that although convolutional neural network (CNN) is a viable machine learning solution to learn robust features of a face in a depth image, CNN requires a significantly more amount of data for training than DNN. Machine learning of the present techniques may implement a pre-trained network on an image database (e.g., Image-Net, AlexNet, GoogleNet, etc.) and may include fine tuning the pre-trained network for anti-spoofing. In one example, refining the pre-trained may include mapping the ASFR feature map as a heat map image of a certain size. In some cases, pre-trained networks may be pre-trained on images and heatmaps and thus may be implemented and refined for the present techniques.

The present techniques provide depth image based face anti-spoofing by receiving an input depth image; normalizing the input depth image to a frontal pose; generating an ASFR by computing the angular direction of each pixel and its distance to an anchor point based on a normalized input depth image; using the ASFR as input to a machine learning model; and determining whether the input depth image is a fake image based on an output of the machine learning model. In some cases, normalizing the input depth image may include positioning the image on an XY graph, aligning a first vector from the left eye to the right eye with the X-axis, and adjusting the image so that the angle between a second vector from the center between the left eye and the right eye to an anchor point (e.g., identified nose tip) and the Y-axis is 45 degrees.

The present techniques have been shown to achieve a low rate false positive rate at a relatively low computational complexity. For example, the present techniques have been shown to run at 60 frames per second (fps) on a digital signal processor (DSP) running on a mobile computing device (e.g., smartphone).

Aspects of the disclosure are initially described in the context of a digital image and process flows related to depth image based face anti-spoofing. Aspects of the disclosure are further illustrated by and described with reference to apparatus diagrams, system diagrams, and flowcharts that relate to depth image based face anti-spoofing.

FIG. 1 illustrates an example of a digital image 100 that supports depth image based face anti-spoofing in accordance with aspects of the present disclosure. Digital image 100 may be obtained in a variety of ways in accordance with the present disclosure. For example, digital image 100 may be obtained by an image sensor such as a camera which is interoperable with a processor capable of implementing aspects of the present disclosure. The camera may include at least one of 3D depth camera, an RGB monochrome camera, a near-infrared camera, or any combination thereof. Additionally or alternatively, digital image 100 may be obtained by a device (e.g., a wireless device) via a transmission received from another device (e.g., over a wireless link, a wired link, a portable memory, etc.).

The device may process digital image 100 by applying operations to pixels 105 (e.g., to extract facial features which may be used for facial recognition or classification). Such processing may generally include one or more of face detection, face tracking, facial landmark detection, face normalization, feature extraction, and identification/verification.

Facial detection refers to identifying the presence of one or more faces in an image or video frame such as digital image 100. For example, face detection algorithms may use template matching techniques to locate faces within digital image 100. In one example, template matching may contain Haar feature extraction, integral image generation, adaptive boosting (Adaboost) training, and cascaded classifiers. Such template matching may include application of a sliding window to digital image 100. For each window, the Haar features of the current window may be computed from an integral image (e.g., which may be computed prior to beginning template matching). These Haar features may be selected by an Adaboost algorithm and may be used to effectively distinguish windows containing faces from those that do not contain faces (e.g., using a cascaded classifier). By way of example, the cascaded classifier may classify the current window into two categories, one for windows containing faces and one for windows that do not contain faces. If one classifier classifies the window as not containing any faces, the window may be discarded. Otherwise (e.g., if the classifier classifies the window as containing a face), another classifier (which is said to be cascaded with the first classifier) may be used to re-test the window. Any windows classified by each cascaded classifier as containing a face may be labeled as facial candidates. After all such windows have been classified, a non-max suppression algorithm may be used to group the face windows around each face to generate the final result of the detected face.

Face tracking may be used to track faces across frames of a video stream. Because facial detection and recognition may be time consuming, it may not be realistic to detect or recognize faces for every frame. Face tracking techniques may be used for recognized faces to reduce the facial recognition time. That is, if a face has been recognized, a facial recognition algorithm may in some cases skip facial recognition in the following several frames (e.g., if the face can be tracked successfully). As an example, face tracking techniques may detect some key points from a detected face in the previous frame. For example, these detected key points may be significant corners on the face such as facial landmarks (e.g., mouth corners, eyes, nose, ears, etc.). The key points may be matched on the current frame with template matching (e.g., using optical flow or local feature matching). Examples of local features include histogram of gradient, local binary pattern (LBP), etc. Based on the tracking results of the key points between the previous frame and the current frame, the faces in the current frame may be located. Other tracking methods may be based on the face detection results. For example, the intersection over union (IOU) of face bounding boxes may be used to determine a correlation between the face detected in the current frame and the face detected in the previous frame. In some cases, two or more tracking techniques may be combined to yield more robust tracking results. Face tracking may reduce facial recognition time (e.g., significantly), which in turn may save processing bandwidth and power consumption.

Facial landmark detection may provide information for face normalization. A landmark detection algorithm may improve the face recognition accuracy. An example landmark detection algorithm is provided in the context of a cascade of regressors method. For example, a cascade of regressors may be learned from faces with labeled landmarks. The combined outputs of the cascade of regressors may provide accurate estimation of landmark locations. That is, the local distribution of features around each landmark may be learned, and the regressors may give the most probable displacement of the landmark from the estimate of the previous regressor.

Face normalization may refer to processing the face image (e.g., digital image 100) to provide facial alignment (e.g., for better recognition results). By way of example, a face normalization method may take two eye centers (e.g., pupils) as reference points. A face image may be translated, rotated, and scaled to adjust the location and/or size of the two eye centers (e.g., using a similarity transform). Alternatively, some face normalization techniques may use more than two points (e.g., two eye centers, two mouth corners, and a nose tip) as reference points. For example, these landmarks may be based on or identified during the facial landmark detection discussed above. In addition to (e.g., or instead of) size normalization, the illumination of the face images to be compared may be normalized. An example illumination normalization method is described in the context of local image normalization. Using a sliding window, each image patch (e.g., each group of pixels 105) may be normalized (e.g., in terms of mean and standard deviation of illumination values). Specifically, the center pixel 105 illumination value may be subtracted from the mean of the local patch and then divided by the standard deviation of the local patch. Another method for lighting compensation may be based on a discrete cosine transform (DCT). The second coefficient of the DCT may represent the change of the first half of a signal relative to the second half of the signal using a cosine signal. Such information may, for example, be used to compensate for lighting differences caused by side light (e.g., which can cause one half of a face to be brighter than the other half of the face). Removing the second coefficient of the DCT transform and doing an inverse DCT may provide left-right lighting normalization.

Feature extraction generally starts from an initial set of measured data (e.g., pixels 105 of digital image 100) and builds derived values (i.e., features), which may in turn facilitate subsequent learning and/or generalization. Generally, feature extraction may reduce repetitiveness of digital image 100 by transforming the pixels 105 into a reduced set of feature maps. The described techniques may provide for efficient feature extraction in the context of object recognition.

Face identification may refer to the process used to select which identifier with which to associate a face. Similarly, face verification may refer to the process used to verify if a face corresponds to an alleged identity. For face identification, a database containing the features of one or more registered faces may be compared with the extracted features of a given query face image (such as digital image 100). For example, the identifier of a registered face which most closely matches the extracted features may be assigned to the query face image. In some cases, similarity may be measured with distance between features (e.g., cosine distance, Euclidean distance, Manhattan distance, Mahalanobis distance). Another method for face identification may apply classification methods, such as support vector machines, to train classifiers which classify different faces using registered face images and other training images. The query face features may be fed into the classifier, and the output of the classifier may be the identifier of the face. For face verification, the provided face image (e.g., digital image 100) may be compared with one or more registered faces. This comparison may be done via metric distance (e.g., Euclidean distance) comparison or using a classifier trained with one or more registered faces of a given person. Face verification may be related to access control for a device and may therefore be associated with higher accuracy than face identification in some examples. That is, metrics around which to optimize face verification may differ from those around which to optimize face identification. As an example, face verification may attempt to reduce false positives (e.g., to prevent unlicensed access to a device). Alternatively, face identification may attempt to reduce a rejection rate (e.g., the percentage of faces not recognized due to the matching scores or classification results falling below a recognition threshold) without significantly suppressing recognition.

Aspects of the present disclosure relate to improved techniques for depth image based face anti-spoofing. A device (e.g., a mobile device) may obtain an array of pixels 105 representing a digital image 100. The device may identify one or more aspects of the object in the image (e.g., left eye, right eye, left eyebrow, right eyebrow, nose, lip, chin, cheek, forehead, left ear, right ear, hair, neck, jawline, etc.). The digital image 100 may include a depth image. In some cases, the device may normalize digital image 100 to a frontal pose. In some cases, the device may normalize digital image 100 and compute the angular direction of each pixel of digital image 100 and compute a distance relative to an anchor point (e.g., identified aspects of the object in the digital image 100) based on the normalized digital image 100. In some cases, the device may generate an ASFR based on the angular direction of each pixel and/or the one or more determined distances to the anchor point. In some cases, the device may use the ASFR as input to a machine learning model and determine whether the digital image 100 is an image of an actual face or an image of a faked face based on an output of the machine learning model.

Figure 2:
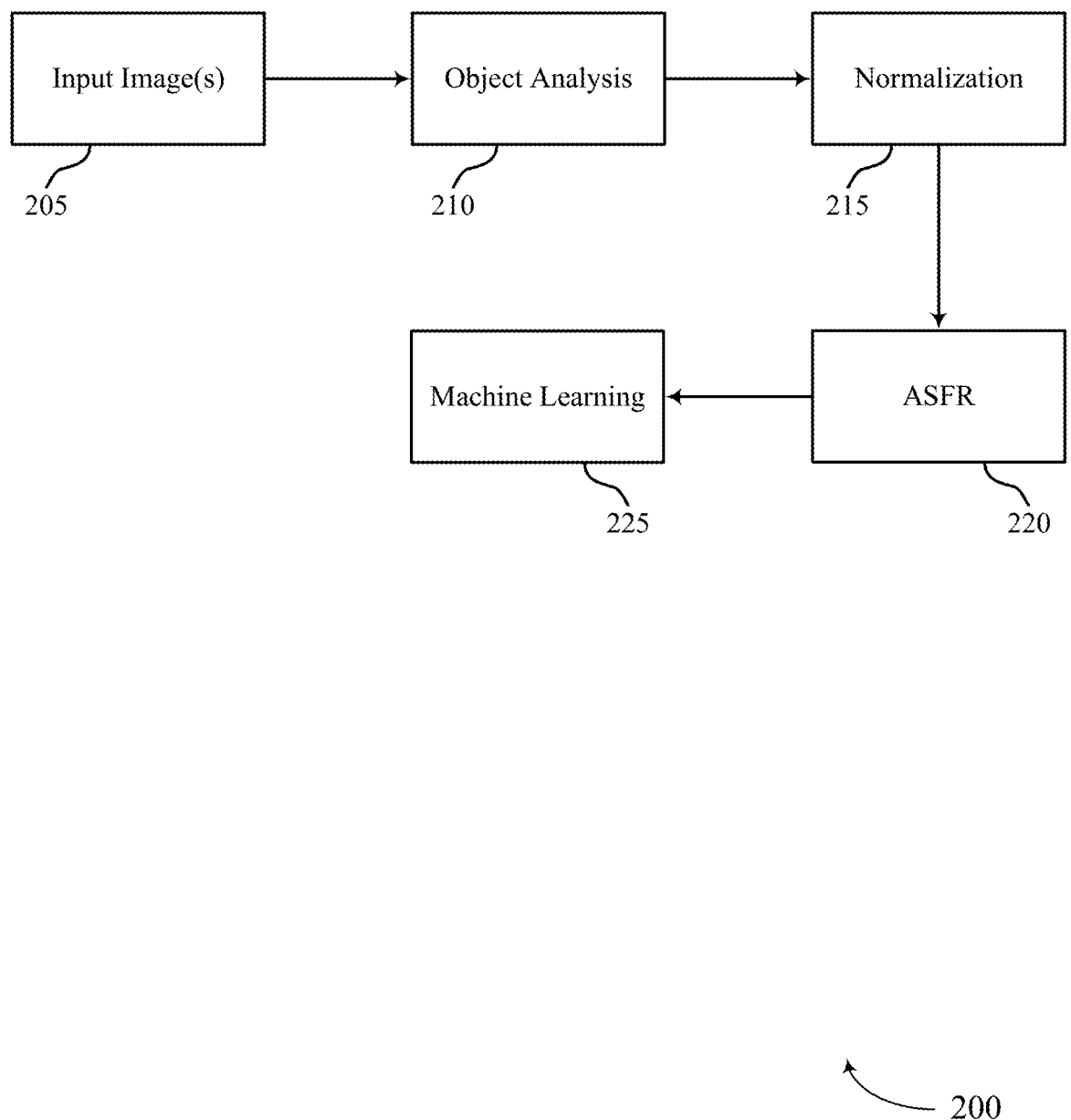
FIG. 2 illustrates an example of a process flow that supports depth image based face anti-spoofing in accordance with aspects of the present disclosure.

FIG. 2 illustrates an example of a process flow 200 that supports depth image based face anti-spoofing in accordance with aspects of the present disclosure. In some examples, process flow 200 may in some cases be performed by a device performing the processing operations described with reference to digital image 100. Additionally or alternatively, process flow 200 may be performed by another device (e.g., a server, a remote device, or the like), and the output of process flow 200 may be communicated to the device (e.g., via a wireless link, via a non-transitory computer readable medium, or the like).

At 205, one or more input images may be obtained. In one example, a depth image captured by a 3D depth camera may be obtained. In some cases, the one or more images may be obtained from a video stream or video file. In some examples, the one or more input images may include several images where each of the several images includes a different perspective of a given object (e.g., a different facial pose, different camera angle of view, etc.).

At 210, object detection may be performed for the input image(s). An example of object detection is provided in the context of facial detection (e.g., as described with reference to FIG. 1). For example, face detection algorithms may use template matching techniques to locate faces within the input image(s). In some cases, the object detection may include identifying one or more features of the object in the image. For example, object detection may include identifying one or more facial features. In one example, object detection may include identifying at least one of a left eye, a right eye, a nose, or any combination thereof.

At 215, normalization may be performed on the input image(s). In some cases, normalization may include adjusting a pose of an object in the input image(s) to a front-facing pose. In some examples, normalization may include resampling the input image(s) on a grid. In some cases, the input image(s) may be resampled on a grid configured with a fixed resolution.

At 220, ASFR may be extracted using the normalized depth image(s). Extracting ASFR may include taking angular directions into account while computing a spherical face representation (SFR), resulting in angular SFR or ASFR. In some cases, ASFR may be used to describe the geometry of an object in the one or more normalized depth images (e.g., to describe the geometry of a face in a normalized depth image, etc.).

At 225, machine learning may be implemented in process flow 200. In some cases, implementing machine learning may include training a machine learning authentication system (e.g., training a neural network) to distinguish between authentic face images (e.g., an image of an actual face) and unauthentic face images (e.g., an image of a printed image of a face). In some cases, implementing machine learning may include feeding ASFR into the trained machine learning authentication system to authenticate input depth images.

Figure 3:
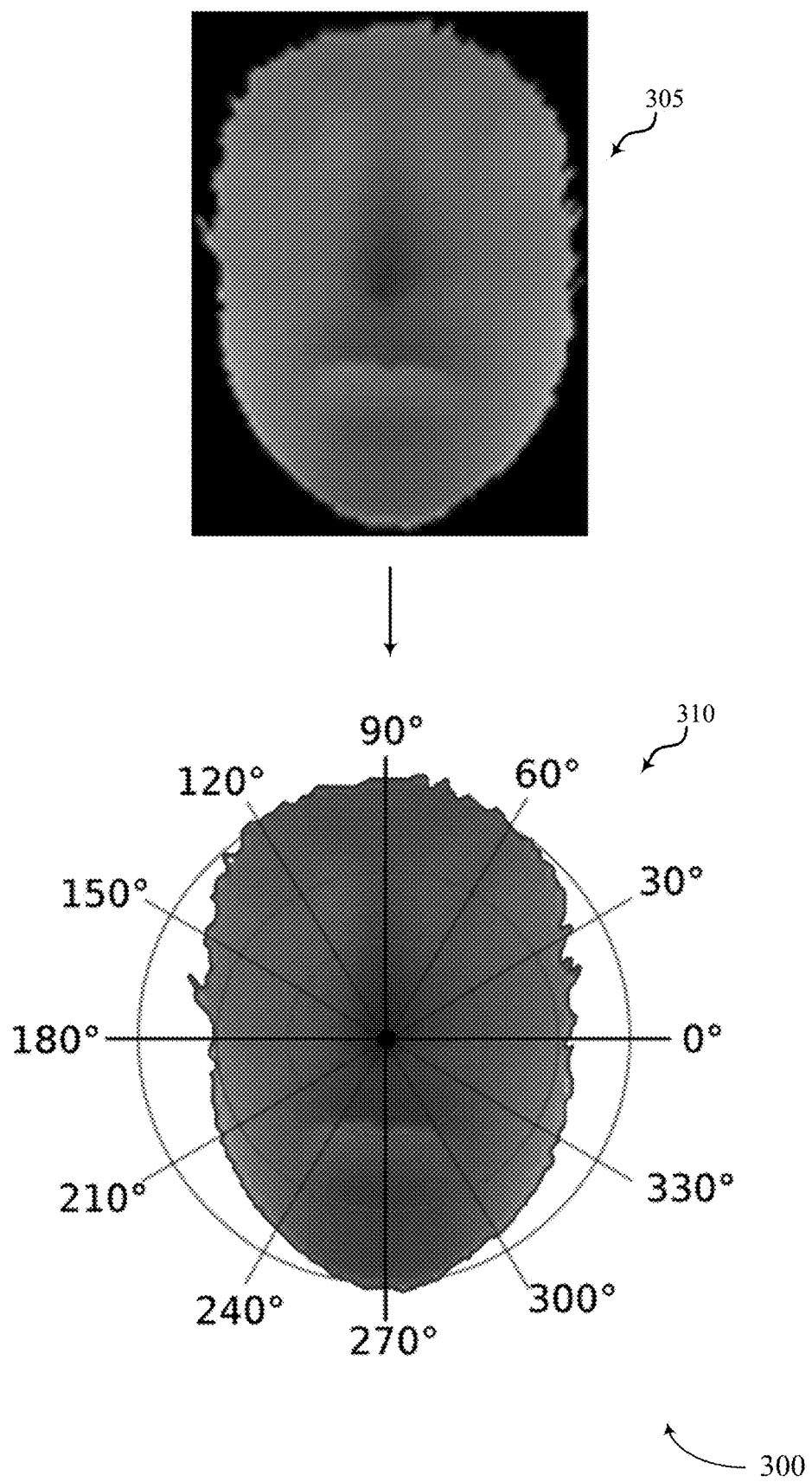
FIG. 3 illustrates an example of a process flow that supports depth image based face anti-spoofing in accordance with aspects of the present disclosure.

FIG. 3 illustrates an example of a process flow 300 that supports depth image based face anti-spoofing in accordance with aspects of the present disclosure. In some cases, process flow 300 may be associated with and/or may be part of process flow 200. In one example, process flow 300 may in some cases be performed by a device performing the processing operations described with reference to digital image 100. Additionally or alternatively, process flow 300 may be performed by another device (e.g., a server, a remote device, or the like), and the output of process flow 300 may be communicated to the device (e.g., via a wireless link, via a non-transitory computer readable medium, or the like).

At 305, an input depth image may be obtained. In some cases, the depth image may be captured by a 3D depth camera. In some cases, the input depth image of 305 may depict an image after normalization has been performed on it. In some cases, the input depth image of 305 may be an example of digital image 100 of FIG. 1.

At 310, the input depth image of may be analyzed in relation to a polar coordinate system. In some cases, analyzing the input depth image may include computing SFR in the polar coordinate system. In some examples, analyzing the input depth image in the polar coordinate system may include computing the direction of each pixel of the input depth image as well. Additionally or alternatively, analyzing the input depth image in the polar coordinate system may include computing the distance of each of the pixels to an anchor point. In some cases, the anchor point may be an identified feature of the input depth image (e.g., left eye, right eye, nose, etc.). In some cases, analyzing the input depth image in the polar coordinate system may include generating a histogram accumulating the pixel count (e.g., starting from zero) in a corresponding bin.

Figure 4:
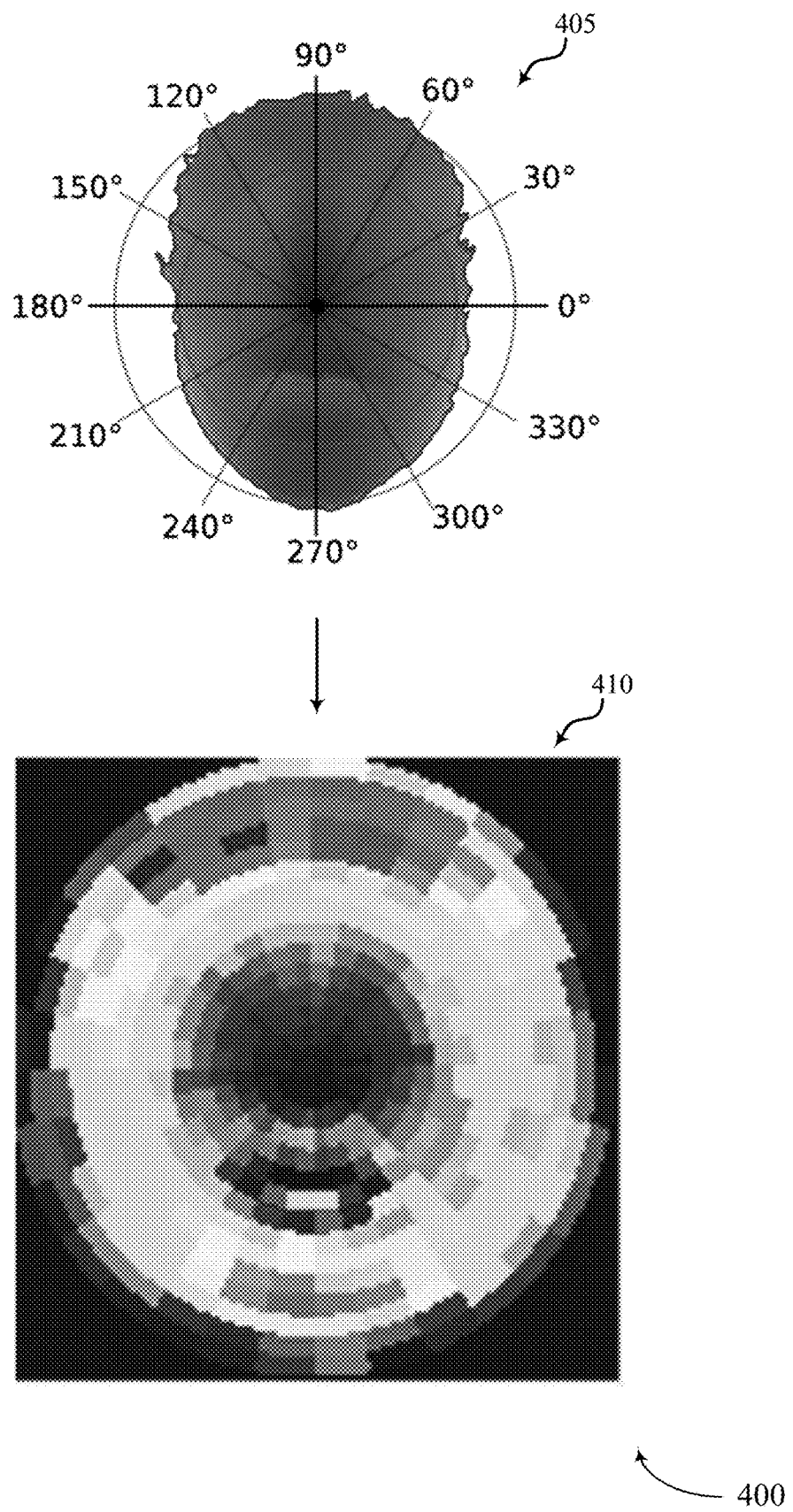
FIG. 4 illustrates an example of a process flow that supports depth image based face anti-spoofing in accordance with aspects of the present disclosure.

FIG. 4 illustrates an example of a process flow 400 that supports depth image based face anti-spoofing in accordance with aspects of the present disclosure. In some cases, process flow 400 may be associated with and/or may be part of process flow 200 and/or process flow 300. In one example, process flow 400 may in some cases be performed by a device performing the processing operations described with reference to digital image 100. Additionally or alternatively, process flow 400 may be performed by another device (e.g., a server, a remote device, or the like), and the output of process flow 400 may be communicated to the device (e.g., via a wireless link, via a non-transitory computer readable medium, or the like).

At 405, process 400 may include computing SFR in a polar coordinate representation. However, SFR is 1D depth feature based on an input depth image and so using just the 1D SFR alone may result in a conventional facial authentication system being spoofed. For example, SFR alone tends to less distinguish between real and fake faces in images. This is because SFR equally treats pixels in different angles. Due to that, conventional SFR by itself is less sensitive to geometry changes in different directions. Accordingly, in addition to computing SFR, at 405 process 400 may further include computing the direction of each pixel of the input depth image and computing the distance of each pixel to an anchor point (e.g., nose, left eye, right eye, etc.).

At 410, process 400 may include computing a histogram based on a Euclidean distance from an anchor point (e.g., an identified feature such as a left eye, right eye, nose, etc.) to the other points on the face region. In some cases, at 410 process 400 may include sorting the computed information of each pixel into a corresponding pixel bin. For example, process 410 may compute that a first pixel has a first pixel direction at a first distance or within a first distance range (e.g., within 1-3 millimeters from the anchor point, etc.) from the anchor point, and compute that a second pixel has a second pixel direction different from the first pixel direction at a second distance/range different from the first distance/range. Accordingly, process 410 may include putting the computed information for the first pixel in a first pixel bin and putting the computed information for the second pixel in a second pixel bin. In some cases, the information placed in each bin may include a pixel identifier unique to each particular pixel. In some cases, process 410 may include accumulating the pixel count in each pixel bin. Accordingly, in some cases each bin may corresponds to a group of pixels specified by a certain angular range and certain distance range simultaneously. In some cases, at 410 process 400 may include generating a 2D histogram based on the accumulated pixel counts for each pixel bin. As shown, process 400 may include mapping the SFR features into a coded image at 410 (e.g., color-coded image for visualization). In some cases, the coded image may enable process 400 to identify differences between color strips of a real face versus the color strips of a fake face. In some cases, each strip covers an area where all pixels in the strip belong to the same pixel bin.

Figure 5:
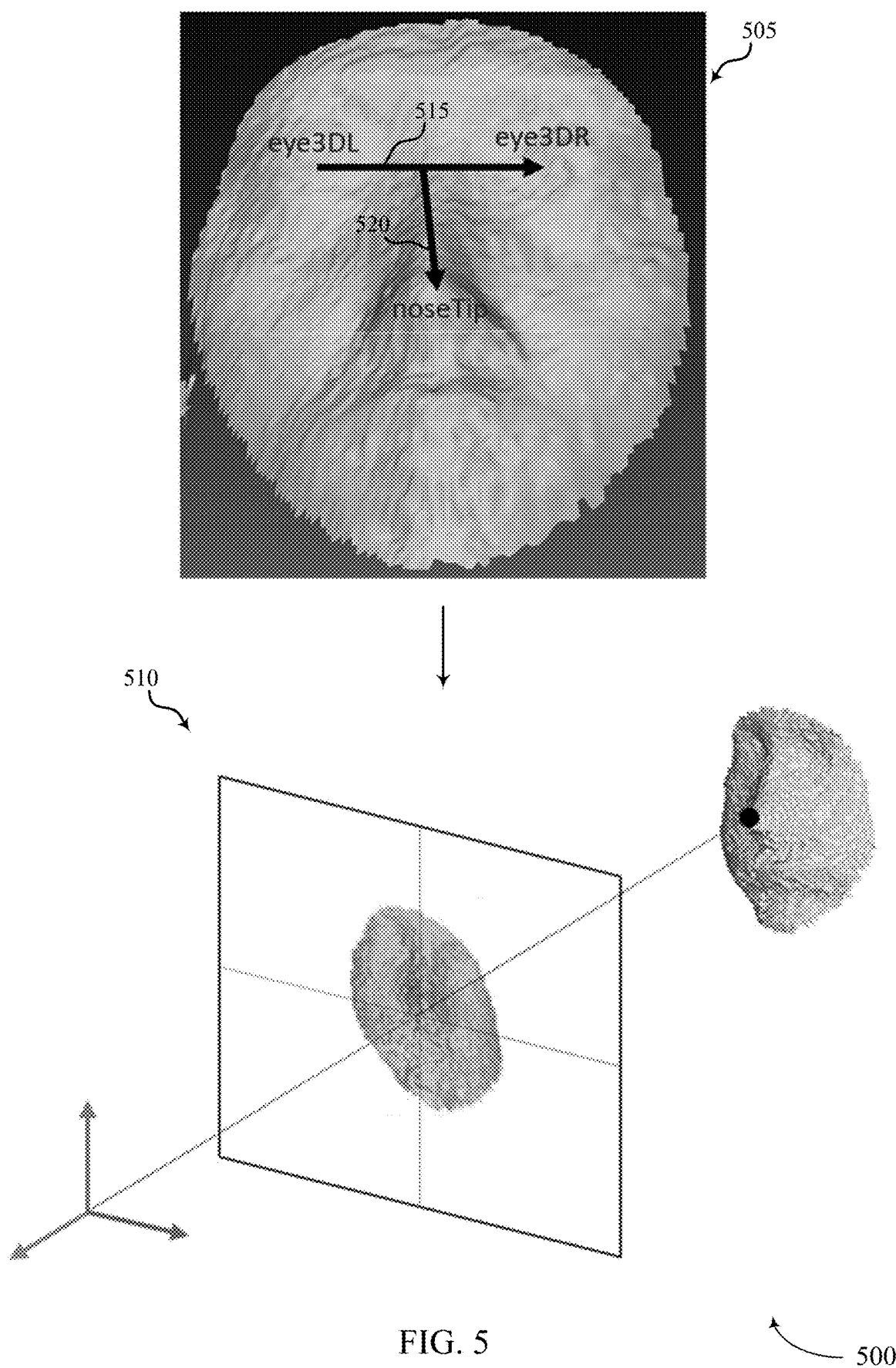
FIG. 5 illustrates an example of a process flow that supports depth image based face anti-spoofing in accordance with aspects of the present disclosure.

FIG. 5 illustrates an example of a process flow 500 that supports depth image based face anti-spoofing in accordance with aspects of the present disclosure. In some cases, process flow 500 may be associated with and/or may be part of process flow 200, process flow 300, and/or process flow 400. In one example, process flow 500 may in some cases be performed by a device performing the processing operations described with reference to digital image 100. Additionally or alternatively, process flow 500 may be performed by another device (e.g., a server, a remote device, or the like), and the output of process flow 500 may be communicated to the device (e.g., via a wireless link, via a non-transitory computer readable medium, or the like).

At 505, process 500 may include performing normalization on an input image. In some cases, intra-class variation can change the appearance of input images and may lead to wrong decisions regarding real and fake images of faces. Accordingly, to reduce the intra-class variation and improve classification, process 500 may include modifying input images so that each image is invariant to different head poses and respective distances from the camera. In one example, to compensate for differences in the distance from head to camera among different input images, process 500 at 505 may include rescaling a face region of an input image and then perform bilinear interpolation so that all the face area from different images have the same width. In some cases, to remove variation of the head pose effect (e.g., direction of the face in the image relative to the camera lens when the image is captured), process 505 may perform a 3D normalization step at 505 that removes head pose and distance effects at the same time. For example, process 500 at 505 may include identifying an anchor point (e.g., nose, eye, etc.) and rotating a 3D model of the input face and making the face frontal by aligning it to the anchor point.

At 510, process 500 may include resampling the depth value of the input image on a fixed plane (e.g., a plane with an X-axis and a Y-axis as shown) to make sure every output image has unified pixel distribution. As shown at 510, process 500 may include using an identified nose tip as an anchor point and aligning this anchor point with a center of a planar field.

In some cases, the head pose correction of process 500 may include identifying roll, pitch, and yaw angles: $\theta_R$, $\theta_P$, $\theta_Y$ and using these angles to rotate the 3D face and make the 3D face frontal with respect to the camera lens when the image was captured. As shown at 505, process 500 may include identifying one or more 3D coordinates such as left eye, right eye, and nose tip, which may be denoted as eye3DL, eye3DR, and noseTip. Accordingly, the illustrated vector p 515 from eye3DL to eye3DR and vector q 520 from center between eye3DR and eye3DL to nose tip may be computed at 505 as follows:

$$p = eye3DR - eye3DL \quad (1)$$

$$q = noseTip - 0.5(eye3DR + eye3DL) \quad (2)$$

In some examples, at 510 process 500 may define a 3D face to be frontal when the rotations of the 3D face result in p being aligned with an X-axis (e.g., X-axis of 510), and when the angle between q and a Y-axis (e.g., Y-axis of 510) is 45 degrees. To meet these two requirements, at 510 process 500 may compute $\theta_R$, $\theta_P$, $\theta_Y$ satisfying $\hat{p}_Y = \hat{p}_Z = 0$ and $$\left| \frac{\hat{q}_Y}{\hat{q}_Z} \right| = 1$$

as follows:

$$\hat{p} = R(\theta_P) R(\theta_Y) R(\theta_R) p \quad (3)$$

$$\hat{q} = R(\theta_P) R(\theta_Y) R(\theta_R) q \quad (4)$$

In some cases, process 500 may refine the nose tip position and then rotate the head using the estimated $\theta_R$, $\theta_P$, $\theta_Y$ followed by projecting the 3D points of the input image to the planar field shown at 510. In some cases, process 500 may use Principle Component Analysis (PCA) on the 3D points to find the principle axis dominating the pitch angle and further refine its value.

Figure 6:
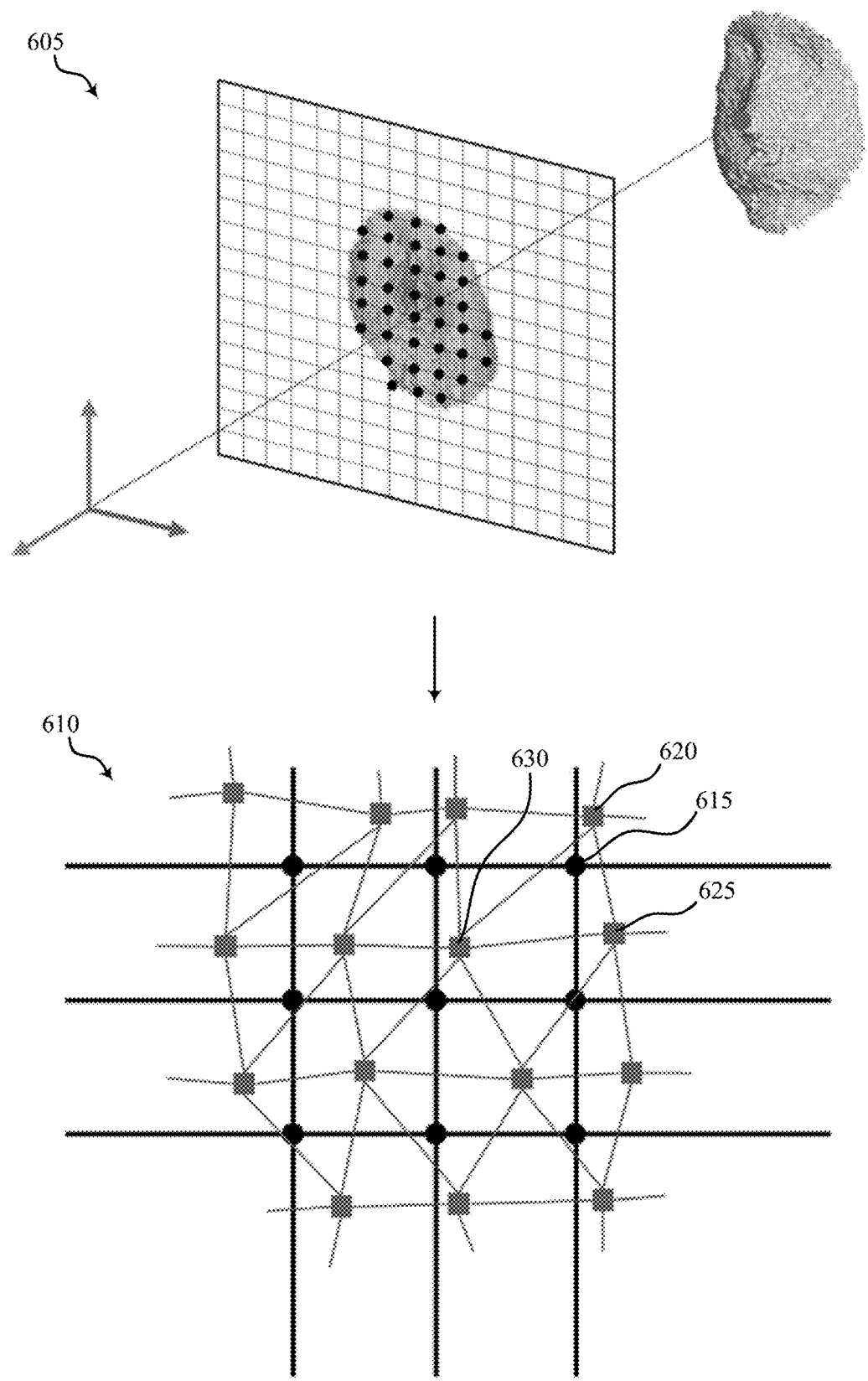
FIG. 6 illustrates an example of a process flow that supports depth image based face anti-spoofing in accordance with aspects of the present disclosure.

FIG. 6 illustrates an example of a process flow 600 that supports depth image based face anti-spoofing in accordance with aspects of the present disclosure. In some cases, process flow 600 may be associated with and/or may be part of process flow 200, process flow 300, process flow 400, and/or process flow 500. In one example, process flow 600 may in some cases be performed by a device performing the processing operations described with reference to digital image 100. Additionally or alternatively, process flow 600 may be performed by another device (e.g., a server, a remote device, or the like), and the output of process flow 600 may be communicated to the device (e.g., via a wireless link, via a non-transitory computer readable medium, or the like).

At 605, process 600 may include resampling the depth value of the input image on a planar fixed grid to make sure every output image has unified pixel distribution. As described above, once all the angles of the pixels are determined, the face position in the input image may be normalized by modifying the 3D face so that the anchor point (e.g., nose tip, etc.) is projected to a fixed 3D position, resulting in the face being invariant to both head pose and distance. However, in some cases the face may be originally at a relatively large distance, and so the input image may be resampled so that all the obtained faces have a similar resolution. Accordingly, at 605 process 600 may include projecting the pose-corrected depth image to a fixed grid by parallel projection (e.g., orthographically projecting every 3D point to the indicated plane). The output depth value on the vertices of grid may be interpolated from nearby input pixels. These points may then be used to compute ASFR. In some cases, 605 may include building the illustrated grid with a specific resolution (e.g., anywhere from 0.1 to 10 mm between each of the vertices).

At 610, process 600 may include interpolating a depth value of a pixel projected onto the provided grid based on the position of one or more neighboring pixels projected on to the grid. In some cases, 610 may include finding reference neighboring points for depth interpolation by preserving the depth image connecting structure. In some examples, at 610 process 600 may preserve the pixel connecting structure and convert the un-ordered point cloud to a mesh of points. In some cases, process 600 may identify one or more triangles of projected pixels and a grid vertex located in each identified triangle of projected pixels. For example, process 600 may determine that vertex 615 is located within a pixel triangle of projected pixel 620, projected pixel 625, and projected pixel 630. In some cases, process 600 may use rasterization to identify each vertex located within a pixel triangle. Accordingly, process 600 may interpolate a depth value for at least one grid vertex using barycentric coordinates computed from the triangle of pixels containing that vertex.

In some cases, process 600 may include determining a mapping function to determine whether a face in an image belongs to a real person or a fake-face image. In some examples, process 600 may denote the ASFR of a face by f, and denote the label of the descriptor f by L. In one example, the label L may be 1 for a true person and −1 for a fake person. Accordingly, process 600 may determine a mapping function M such that:

$$L = M(f) \quad (6)$$

In some cases, solving for M may be done by solving for a regressor assuming a linear relationship between f and L, which may be determined as follows:

$$L = M \cdot f + b \quad (7)$$

where b is a bias term. In some cases, solving for equation (7) may include gathering some training data which contains Angular SFR features for real and fakes faces and solving for M as follows:

$$\operatorname*{argmin}_{M} \|L - M \cdot f\|^2 \quad (8)$$

In some cases, equation (8) may be solved by a variation of regression or least squares such as Partial Least Squares. In some cases, process 600 may find an optimal plane that separates the two classes of real and fake faces via equation (8). In some cases, via equation (8), process 600 may find a hyperplane that maximizes the distance or margin w between the two classes, which may be formulated as follows:

$$\operatorname*{argmin}_{w} \frac{1}{2}\|w\|^2 \quad (9)$$

where equation (9) may be subject to the following:

$$L \cdot (\vec{w} \cdot \vec{f} - b) \geq 1 \quad (10)$$

for any feature f from the overall feature set used in training. In some cases, Support Vector Machines (SVM) may be used to estimate non-linear hyperplanes by including the kernel method that maps the features to a higher dimensional space where the hyperplane may be determined.

In some examples, to formulate a deep learning network for ASFR, process 600 may use a pre-trained network and fine tune pre-trained network. To make use of these pre-trained networks and refine them for anti-spoofing, process 600 may map the ASFR feature map as a heat map image of a certain size as shown in 410 of FIG. 4. In some cases, a network may be pre-trained on images. In some cases, at least some of those images may include heatmaps. In some cases, process 600 may include mapping an ASFR feature vector to images. In some cases, a grayscale image similar to 410 of FIG. 4 may be obtained by spatially interpolating the resulting feature vector into an image of random size. In some cases, process 600 may include mapping the image of random size into color space by using jet coding. Such mapping may be done given a grayscale image with a pixel value $v_{ij}$ at a location i,j in the image:

$$b_{ij} = 255 \cdot \operatorname{clamp}(\min(v_{ij}/64 + 0.5, -v_{ij}/64 + 2.5)) \quad (11)$$

$$g_{ij} = 255 \cdot \operatorname{clamp}(\min(v_{ij}/64 + 0.5, -v_{ij}/64 + 3.5)) \quad (12)$$

$$r_{ij} = 255 \cdot \operatorname{clamp}(\min(v_{ij}/64 + 0.5, -v_{ij}/64 + 4.5)) \quad (13)$$

where $b_{ij}$, $g_{ij}$, $r_{ij}$ are the indexed values of the blue, green and red channels of the JET coded image and clamp is a function to limit the values between 0 and 1. Given such images, process 600 may include fine-tuning a network using a loss function which may be written as follows:

$$p(L)_i = \frac{\exp(L_i)}{\sum_{k=0}^{1} \exp(L_k)} \quad (14)$$

Figure 7:
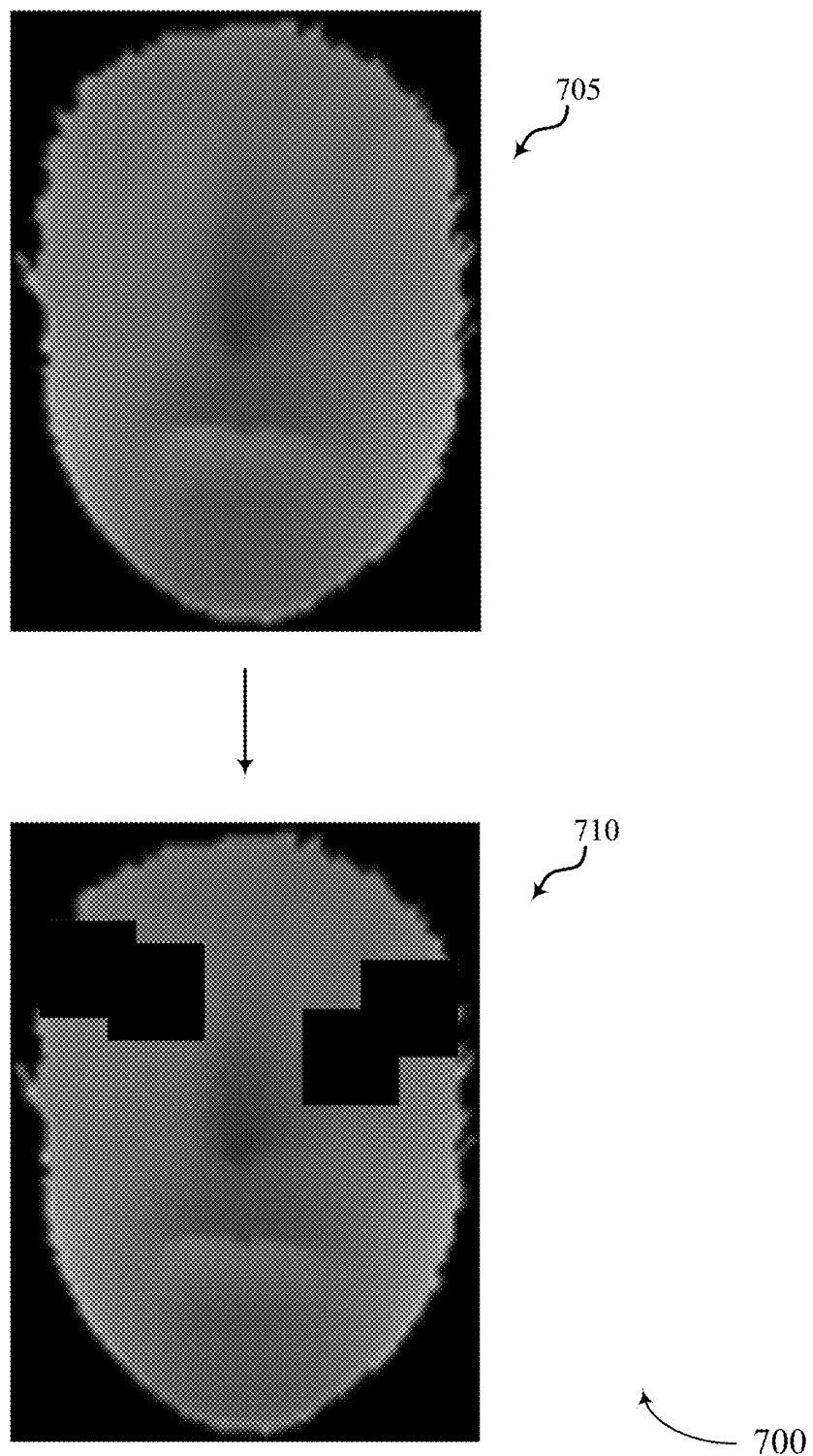
FIG. 7 illustrates an example of a process flow that supports depth image based face anti-spoofing in accordance with aspects of the present disclosure.

FIG. 7 illustrates an example of a process flow 700 that supports depth image based face anti-spoofing in accordance with aspects of the present disclosure. In some cases, process flow 700 may be associated with and/or may be part of process flow 200, process flow 300, process flow 400, process flow 500, and/or process flow 600. In one example, process flow 700 may in some cases be performed by a device performing the processing operations described with reference to digital image 100. Additionally or alternatively, process flow 700 may be performed by another device (e.g., a server, a remote device, or the like), and the output of process flow 700 may be communicated to the device (e.g., via a wireless link, via a non-transitory computer readable medium, or the like).

At 705, process 700 includes obtaining an input depth image. In some cases, limited number of training data may make a trained machine learning model overfit, resulting in the model having a poor generalization capability. To prevent this, process 700 may include augmenting the training data by synthesizing new training data from existing training datasets. For example, process 700 may include synthesizing additional training data from the input depth image obtained at 705. For example, process 700 may include at least one of varying a depth distance from camera (e.g., simulating variations in depth distance, etc.), adding random depth noise, or adding different occlusions models, or any combination thereof.

At 710, process 700 may include generate one or more patches and placing the one or more patches of the input depth image of 705. In some cases, the one or more patches may be created at a specific depth in relation to the various depths of the input depth image of 705. In some cases, the one or more patches may be generated and then placed randomly over the input depth image of 705. In some cases, the one or more patches may be placed over a particular area such as the eye area, the nose area, the mouth area, etc. In some cases, the one or more patches may be placed randomly over at least one particular area. In some examples, the size of the one or more patches may be randomly selected. In some cases, the patches may be generated randomly within a predetermined range of possible sizes. In some examples, the shapes of the patches may be randomly selected. For example, the shapes of the patches may be selected from a list of possible shapes such as square, rectangle, triangle, circle, hexagon, etc. After placing at 710 the one or more patches over the input depth image of 705, the occluded depth image of 710 may be added to the training data of a machine learning model. In some cases, multiple occluded depth images may be generated from the input depth image of 705. In some cases, process 700 may generate a predetermined number of different occluded depth images from a single input depth image (e.g., the input depth image of 705). For example, a first set of patches may be generated and placed over the input depth image of 705 to create a first occluded depth image, and then the placement of the first set of patches may be modified to generate a second occluded depth image. Additionally or alternatively, a second set of patches may be generated and placed over the input depth image of 705 to create at least one additional occluded depth image. In some examples, the one or more patches may be added only to input depth images of unauthentic faces. For example, the input depth image of 705 may represent an image of a faked face and thus the one or more patches may be added to occlude certain portions of the input depth image of 705, while process 700 would refrain from adding patches to input depth images of actual faces.

Figure 8:
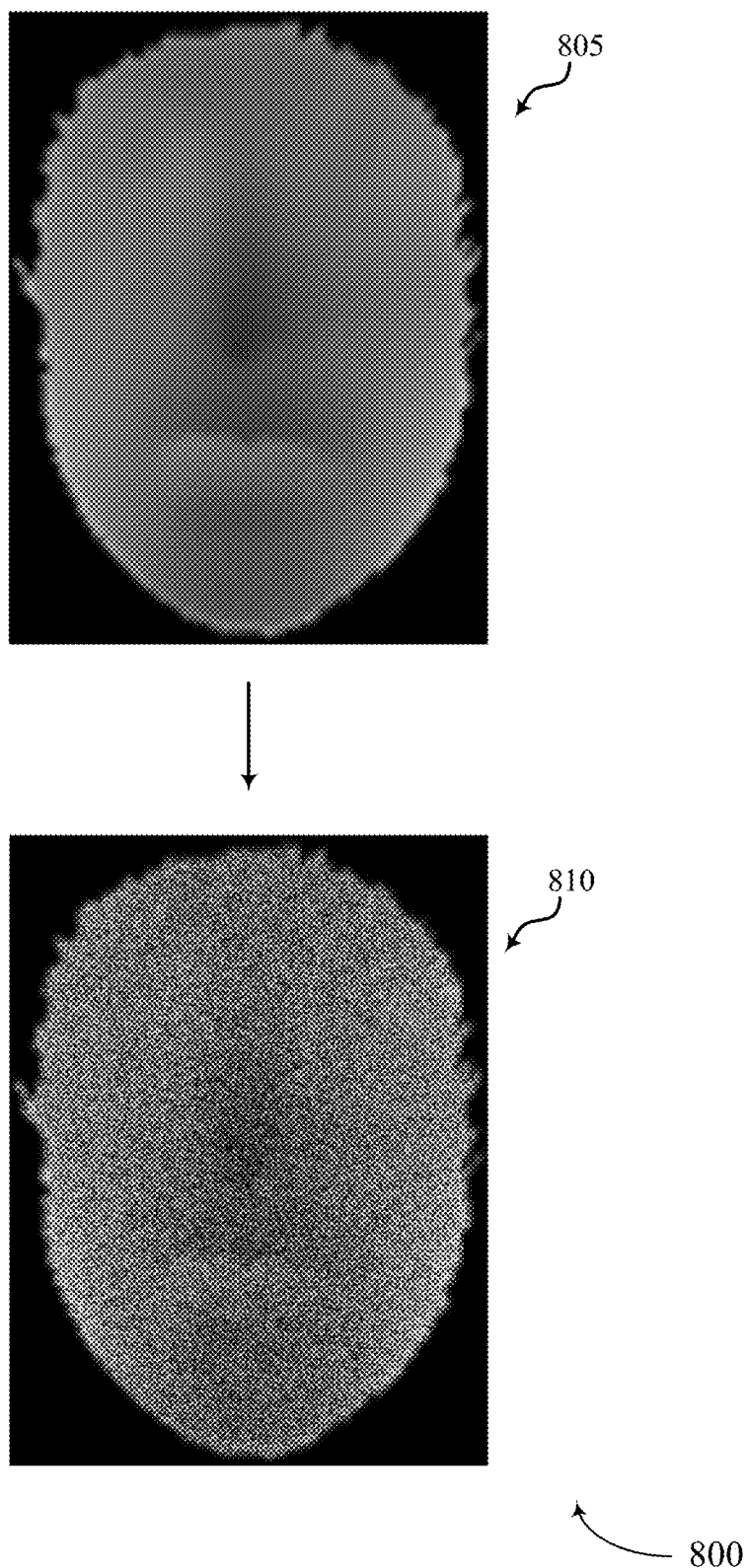
FIG. 8 illustrates an example of a process flow that supports depth image based face anti-spoofing in accordance with aspects of the present disclosure.

FIG. 8 illustrates an example of a process flow 800 that supports depth image based face anti-spoofing in accordance with aspects of the present disclosure. In some cases, process flow 800 may be associated with and/or may be part of process flow 200, process flow 300, process flow 400, process flow 500, process flow 600, and/or process flow 700. In one example, process flow 800 may in some cases be performed by a device performing the processing operations described with reference to digital image 100. Additionally or alternatively, process flow 800 may be performed by another device (e.g., a server, a remote device, or the like), and the output of process flow 800 may be communicated to the device (e.g., via a wireless link, via a non-transitory computer readable medium, or the like).

At 805, process 800 includes obtaining an input depth image. At 810, process 800 may include adding random depth noise to the input depth image of 805. In one example, process 800 may include adding Gaussian noise the input depth image of 805. In some cases, process 800 may include adding noise to one or more individual pixels of the input depth image of 805. For example, process 800 may include adding Gaussian noise to each of the pixels or at least a portion of the pixels of the input depth image of 805. In some cases, process 800 may include adding noise to input depth images of actual faces and/or to input depth images of fake faces. In some cases, process 800 may include adding noise only to input depth images of fake faces. In some cases, process 800 may generate a predetermined number of different noisy input depth images from a single input depth image (e.g., the input depth image of 805). In some cases, process 800 may include iteratively adding a random amount of noise to the input depth image of 805. For example, process 800 may include adding a first portion of noise to the input depth image of 805 to create a first noisy input depth image, then adding a second portion of noise to the input depth image of 805 to create a second noisy input depth image (and so on), where the second portion of noise is different than he first portion of noise.

Figure 9:
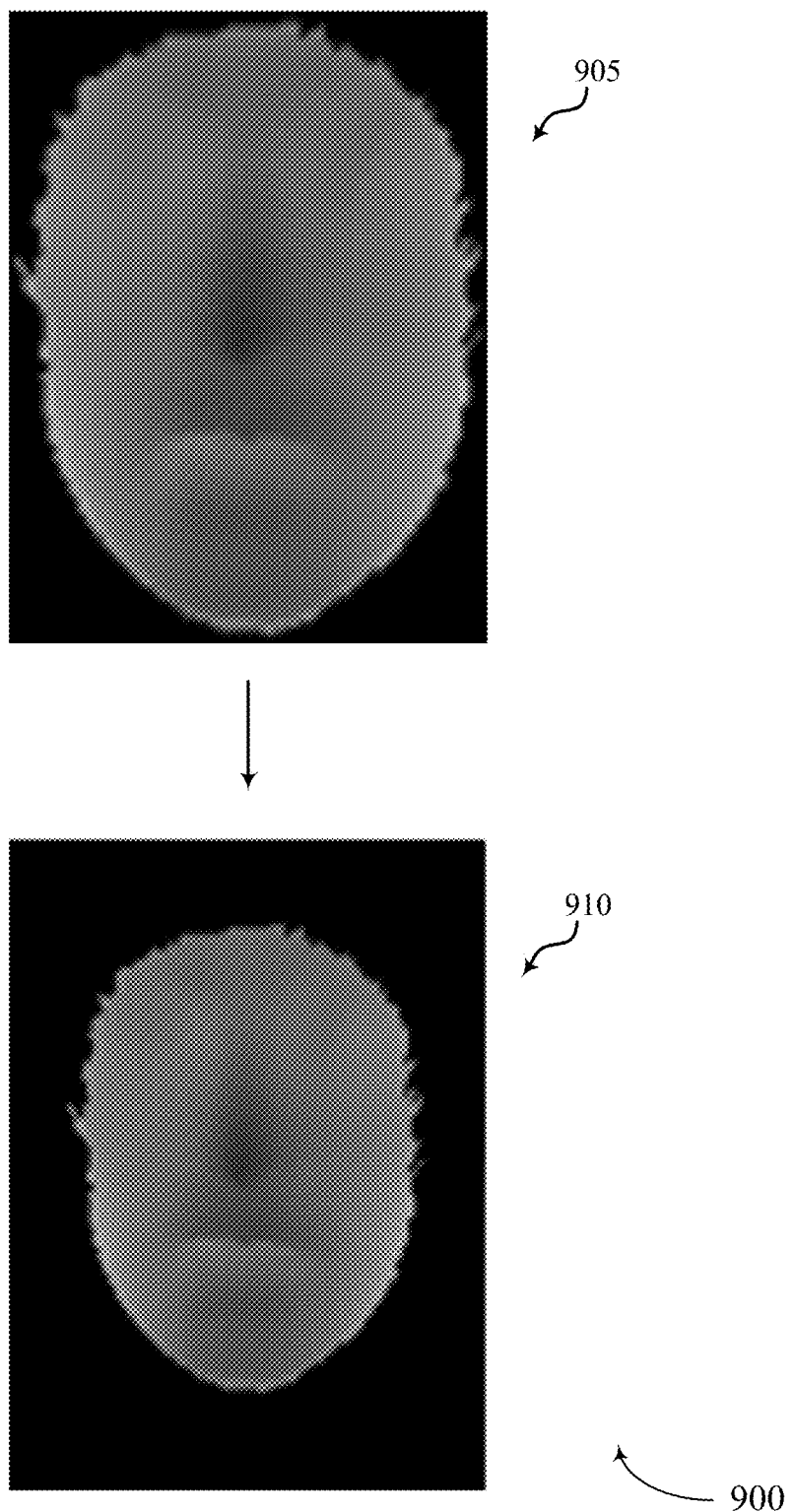
FIG. 9 illustrates an example of a process flow that supports depth image based face anti-spoofing in accordance with aspects of the present disclosure.

FIG. 9 illustrates an example of a process flow 900 that supports depth image based face anti-spoofing in accordance with aspects of the present disclosure. In some cases, process flow 900 may be associated with and/or may be part of process flow 200, process flow 300, process flow 400, process flow 500, process flow 600, process flow 700, and/or process flow 800. In one example, process flow 900 may in some cases be performed by a device performing the processing operations described with reference to digital image 100. Additionally or alternatively, process flow 900 may be performed by another device (e.g., a server, a remote device, or the like), and the output of process flow 900 may be communicated to the device (e.g., via a wireless link, via a non-transitory computer readable medium, or the like).

At 905, process 900 includes obtaining an input depth image. At 910, process 900 may include varying a depth distance from a camera to generate one or more simulated distance input depth images. For example, the input depth image of 905 may include a face captured at a certain depth relative to the camera lens. At 910, process 900 may include simulating the same face being captured at other depths relative to the camera lens. Thus, process 900 may include simulating a face being captured at one or more various depth distances relative to a camera lens. As shown at 910, process 900 may include simulating moving the face of the input depth image of 905 further away from the camera lens. Additionally or alternatively, process 900 may include simulating moving the face of the input depth image of 905 closer to the camera lens. In some cases, process 900 may include generating one or more simulated distance input depth images of actual faces and/or generating one or more simulated distance input depth images of fake faces. In some cases, process 800 may include generating one or more simulated distance input depth images of only fake faces.

In some cases, process 900 may include augmenting the training data of a machine learning model with the one or more simulated distance input depth images. In some cases, process 900 may generate a predetermined number of different simulated distance input depth images from a single input depth image (e.g., the input depth image of 905). For example, process 900 may include generating a first simulated distance input depth image at a first distance (e.g., predetermined first distance) and generating a second simulated distance input depth image at a second distance (e.g., predetermined second distance), and so on, where the second distance is different from the first distance. In some cases, process 900 may include simulating.

Figure 10:
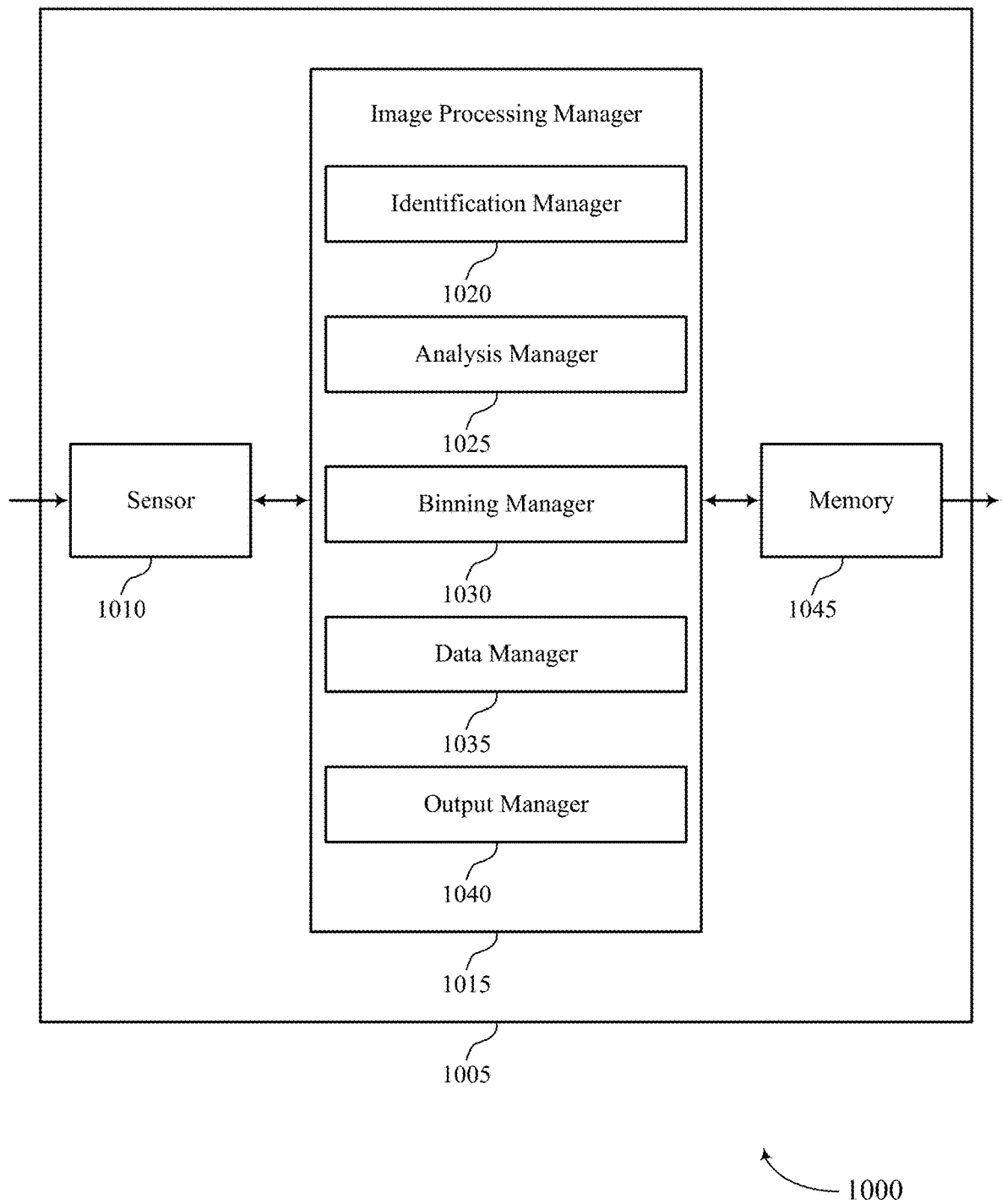
FIG. 10 show a block diagram of a device that support depth image based face anti-spoofing in accordance with aspects of the present disclosure.

FIG. 10 shows a block diagram 1000 of a device 1005 that supports depth image based face anti-spoofing in accordance with aspects of the present disclosure. The device 1005 may be an example of aspects of a device 1005 as described herein. The device 1005 may include sensor 1010, image processing block 1015, and memory 1060. Each of these components may be in communication with one another (e.g., via one or more buses).

Sensor 1010 may include or be an example of a digital imaging sensor for taking photos and video. In some examples, sensor 1010 may receive information such as packets, user data, or control information associated with various information channels (e.g., from a transceiver 1220 described with reference to FIG. 12). Information may be passed on to other components of the device. Additionally or alternatively, components of device 1005 used to communicate data over a wireless (e.g., or wired) link may be in communication with image processing block 1015 (e.g., via one or more buses) without passing information through sensor 1010.

Image processing block 1015 may be an example of aspects of the processor 1240 described with reference to FIG. 12. Image processing block 1015 and/or at least some of its various sub-components may be implemented in hardware, software executed by a processor, firmware, or any combination thereof. If implemented in software executed by a processor, the functions of the image processing block 1015 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

Image processing block 1015 and/or at least some of its various sub-components may be physically located at various positions, including being distributed such that portions of functions are implemented at different physical locations by one or more physical devices. In some examples, image processing block 1015 and/or at least some of its various sub-components may be a separate and distinct component in accordance with various aspects of the present disclosure. In other examples, image processing block 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The image processing manager 1015 may include an identification manager 1020, an analysis manager 1025, a binning manager 1030, a data manager 1035, and an output manager 1040. The image processing manager 1015 may be an example of aspects of the image processing manager 1310 described herein.

The identification manager 1020 may identify a face in a first image based on identifying one or more biometric features of the face and identify an anchor point on the identified face. The analysis manager 1025 may determine an angular direction of one or more pixels of the identified face. The binning manager 1030 may sort each of one or more pixels of the identified face into one of a set of pixel bins based on a combination of the determined angular direction of the pixel and a distance between the pixel and the identified anchor point.

The data manager 1035 may generate a two-dimensional histogram based on a number of pixels in each bin. The output manager 1040 may output an indication of authenticity associated with the face based on the two-dimensional histogram.

Memory 1045 may store information (e.g., facial feature information) generated by other components of the device such as image processing block 1015. For example, memory 1045 may store facial feature information with which to compare an output of image processing block 1015. Memory 1045 may comprise one or more computer-readable storage media. Examples of memory 1045 include, but are not limited to, random access memory (RAM), static RAM (SRAM), dynamic RAM (DRAM), read-only memory (ROM), electrically erasable programmable read-only memory (EEPROM), compact disc read-only memory (CD-ROM) or other optical disc storage, magnetic disc storage, or other magnetic storage devices, flash memory, or any other medium that can be used to store desired program code in the form of instructions or data structures and that can be accessed by a computer or a processor (e.g., image processing block 1015).

Figure 11:
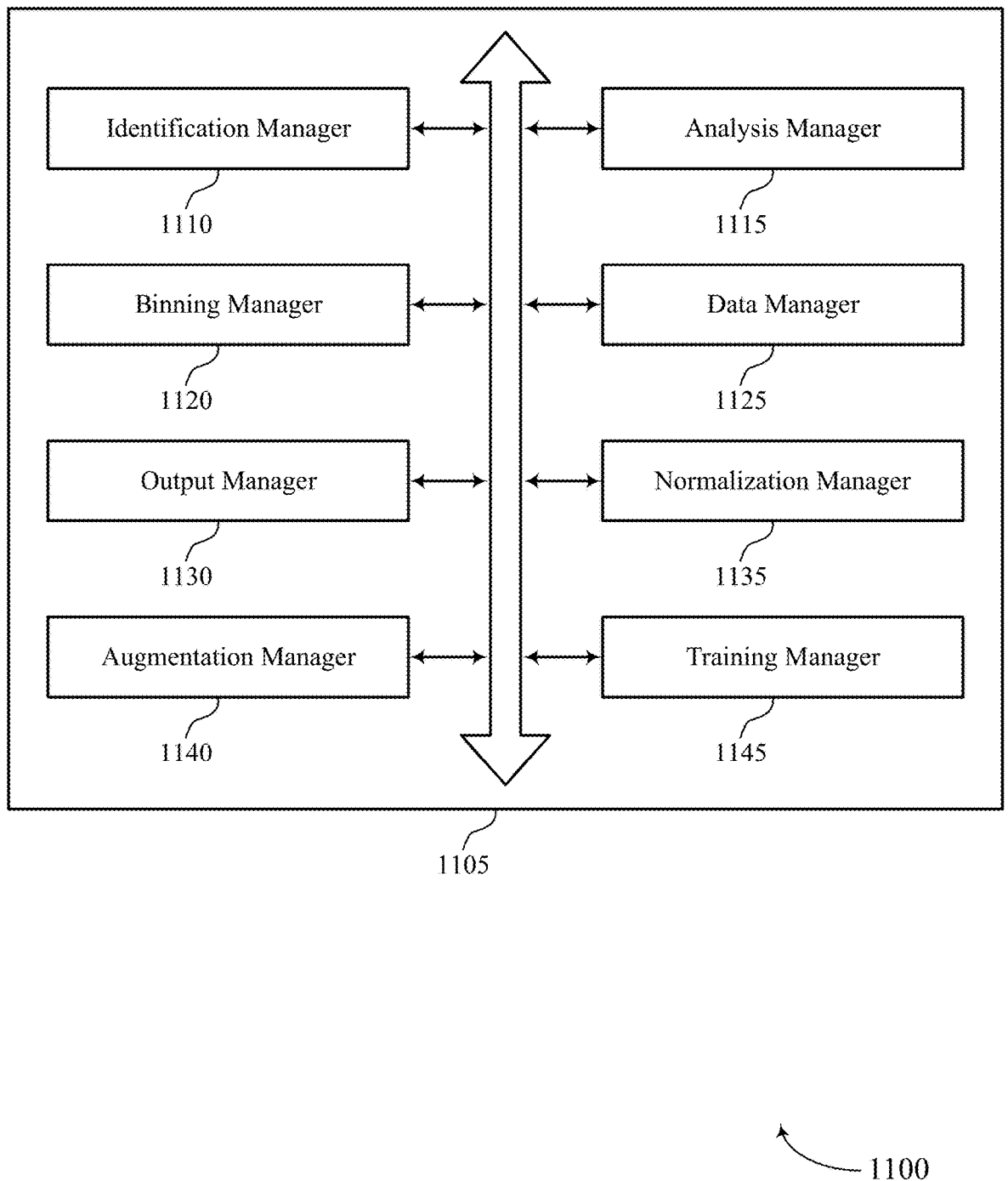
FIG. 11 shows a block diagram of an image processing manager that supports depth image based face anti-spoofing in accordance with aspects of the present disclosure.

FIG. 11 shows a block diagram 1100 of an image processing manager 1105 that supports depth image based face anti-spoofing in accordance with aspects of the present disclosure. The image processing manager 1105 may be an example of aspects of an image processing manager 1015, an image processing manager 1115, or an image processing manager 1310 described herein. The image processing manager 1105 may include an identification manager 1110, an analysis manager 1115, a binning manager 1120, a data manager 1125, an output manager 1130, a normalization manager 1135, an augmentation manager 1140, and a training manager 1145. Each of these modules may communicate, directly or indirectly, with one another (e.g., via one or more buses).

The identification manager 1110 may identify a face in a first image based on identifying one or more biometric features of the face. In some examples, the identification manager 1110 may identify an anchor point on the identified face. The analysis manager 1115 may determine an angular direction of one or more pixels of the identified face.

In some examples, the analysis manager 1115 may determine an angular position of the identified face in a three dimensional space, the first image including three dimensional image data. In some examples, the analysis manager 1115 may determine a depth of the face in the three dimensional space is not at a predetermined depth. In some examples, the analysis manager 1115 may analyze the second image by feeding the second image into the machine learning model.

In some examples, the analysis manager 1115 may determine whether the face in the second image is an authentic face or an unauthentic face based on the training of the machine learning model. The binning manager 1120 may sort each of one or more pixels of the identified face into one of a set of pixel bins based on a combination of the determined angular direction of the pixel and a distance between the pixel and the identified anchor point. The data manager 1125 may generate a two-dimensional histogram based on a number of pixels in each bin.

In some examples, the data manager 1125 may receive a second image of a face in three dimensional space. The output manager 1130 may output an indication of authenticity associated with the face based on the two-dimensional histogram.

The normalization manager 1135 may move the face in the three dimensional space until the anchor point is pointed in a predetermined direction in the three dimensional space. In some examples, the normalization manager 1135 may adjust the depth of the face in the three dimensional space to be at the predetermined depth. The augmentation manager 1140 may augment a database of face image samples by making at least one copy of the first image, adjusting one or more aspects of the face in the at least one copy of the first image, and adding the adjusted copy of the first image to the database.

In some examples, the augmentation manager 1140 may move the face in the at least one copy in three-dimensional space a predetermined distance away from or toward a point of view of a depth camera that captured the first image. In some examples, the augmentation manager 1140 may add a predetermined amount of Gaussian noise to at least one pixel of the face in the at least one copy. In some examples, the augmentation manager 1140 may generate one or more patches, each patch including at least one black pixel.

In some examples, the augmentation manager 1140 may place at least one of the one or more patches randomly or in a predetermined location over a portion of the face in the at least one copy. In some examples, the augmentation manager 1140 may make the at least one copy of the first image and adjusting the one or more aspects of the face in the at least one copy of the first image when the face in the first image is determined to be an unauthentic face. The training manager 1145 may train a machine learning model to distinguish between unauthentic face images and authentic face images.

Figure 12:
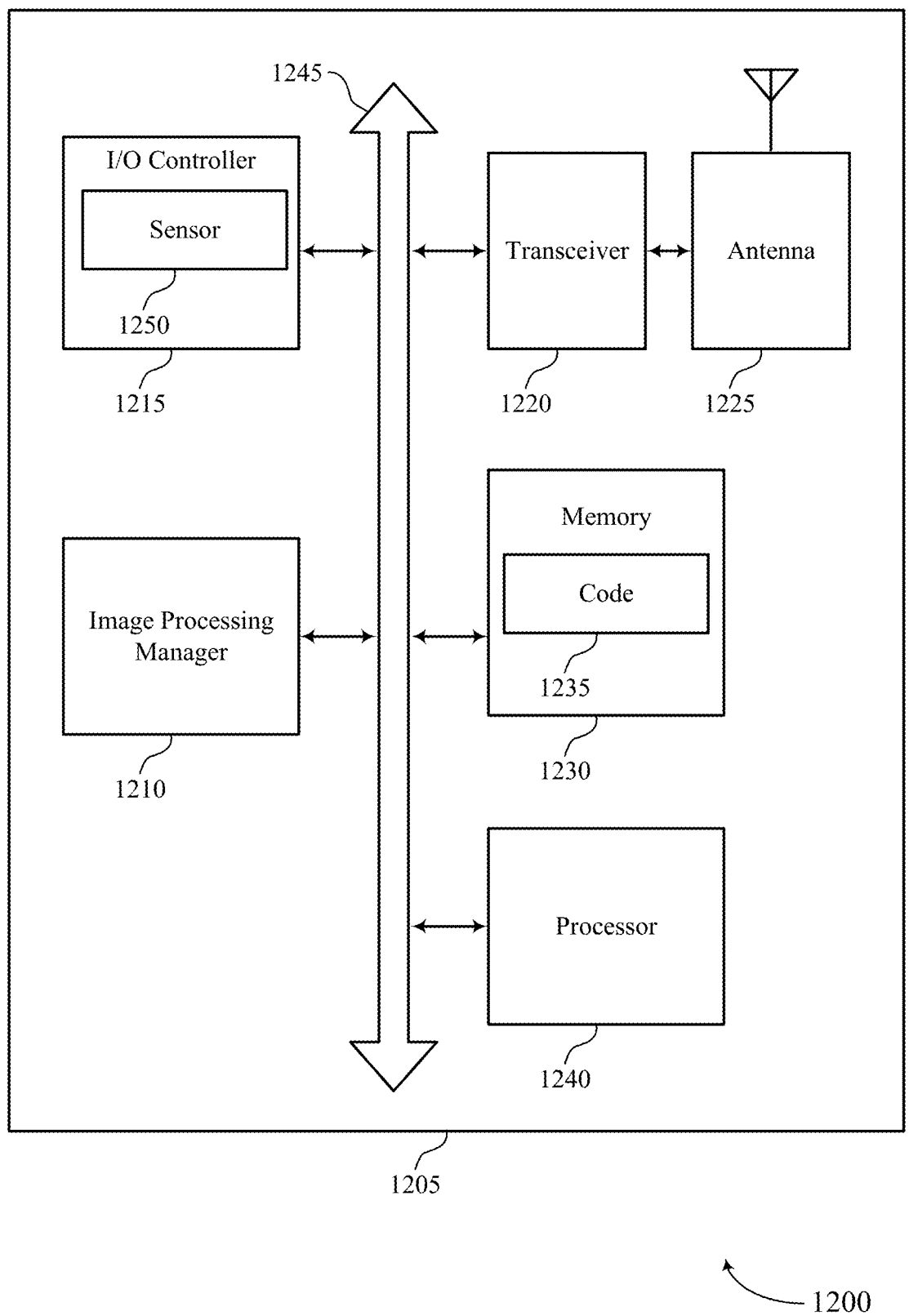
FIG. 12 shows a diagram of a system including a device that supports depth image based face anti-spoofing in accordance with aspects of the present disclosure.

FIG. 12 shows a diagram of a system 1200 including a device 1205 that supports depth image based face anti-spoofing in accordance with aspects of the present disclosure. The device 1205 may be an example of or include the components of device 1005, device 1105, or a device as described herein. The device 1205 may include components for bi-directional voice and data communications including components for transmitting and receiving communications, including an image processing manager 1210, an I/O controller 1215, a sensor 1250, a transceiver 1220, an antenna 1225, memory 1230, and a processor 1240. These components may be in electronic communication via one or more buses (e.g., bus 1245).

The image processing manager 1210 may identify a face in a first image based on identifying one or more biometric features of the face, identify an anchor point on the identified face, determine an angular direction of one or more pixels of the identified face, sort each of one or more pixels of the identified face into one of a set of pixel bins based on a combination of the determined angular direction of the pixel and a distance between the pixel and the identified anchor point, generate a two-dimensional histogram based on a number of pixels in each bin, and output an indication of authenticity associated with the face based on the two-dimensional histogram. The image processing manager 1210 may also select an anchor point on a three-dimensional image of a face, rotate the anchor point to align in a predetermined direction in three-dimensional space, generate on a two-dimensional plane a grid of vertices with a set resolution between each vertex, orthogonally project each 3D point of the three-dimensional image of the face onto the two-dimensional plane, each vertex being located within a triangle formed by the 3D points, and interpolate a depth value for each vertex of the grid based on computing one or more barycentric coordinates from each triangle enclosing a vertex from the grid of vertices.

The I/O controller 1215 may manage input and output signals for the device 1205. The I/O controller 1215 may also manage peripherals not integrated into the device 1205. In some cases, the I/O controller 1215 may represent a physical connection or port to an external peripheral. In some cases, the I/O controller 1215 may utilize an operating system such as iOS®, ANDROID®, MS-DOS®, MS-WINDOWS®, OS/2®, UNIX®, LINUX®, or another known operating system. In other cases, the I/O controller 1215 may represent or interact with a modem, a keyboard, a mouse, a touchscreen, or a similar device. In some cases, the I/O controller 1215 may be implemented as part of a processor. In some cases, a user may interact with the device 1205 via the I/O controller 1215 or via hardware components controlled by the I/O controller 1215. In some cases, I/O controller 1215 may be or include sensor 1250 (e.g., a digital imaging sensor for taking photos and video).

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions. The memory 1230 may include RAM and ROM. The memory 1230 may store computer-readable, computer-executable code 1235 including instructions that, when executed, cause the processor to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting depth image based face anti-spoofing).

The code 1235 may include instructions to implement aspects of the present disclosure, including instructions to support image processing. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
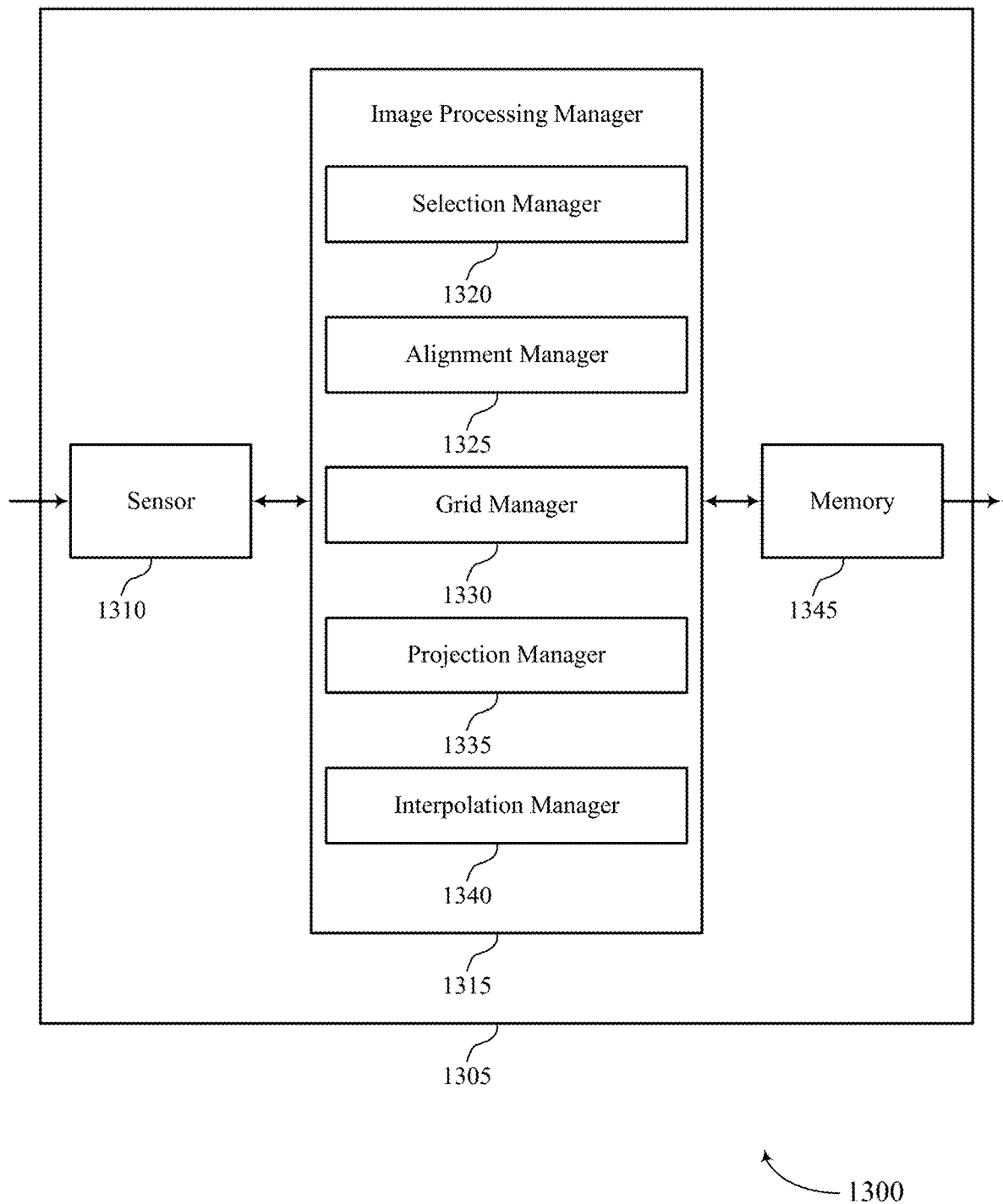
FIG. 13 shows a block diagram of a device that support depth image based face anti-spoofing in accordance with aspects of the present disclosure.

FIG. 13 shows a block diagram 1300 of a device 1305 that supports depth image based face anti-spoofing in accordance with aspects of the present disclosure. The device 1305 may be an example of aspects of a device 1305 as described herein. The device 1305 may include sensor 1310, image processing block 1315, and memory 1360. Each of these components may be in communication with one another (e.g., via one or more buses).

Sensor 1310 may include or be an example of a digital imaging sensor for taking photos and video. In some examples, sensor 1310 may receive information such as packets, user data, or control information associated with various information channels (e.g., from a transceiver 1220 described with reference to FIG. 12). Information may be passed on to other components of the device. Additionally or alternatively, components of device 1305 used to communicate data over a wireless (e.g., or wired) link may be in communication with image processing block 1315 (e.g., via one or more buses) without passing information through sensor 1310.

Image processing block 1315 may be an example of aspects of the processor 1240 described with reference to FIG. 12. Image processing block 1315 and/or at least some of its various sub-components may be implemented in hardware, software executed by a processor, firmware, or any combination thereof. If implemented in software executed by a processor, the functions of the image processing block 1315 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The image processing manager 1315 may include a selection manager 1320, an alignment manager 1325, a grid manager 1330, a projection manager 1335, and an interpolation manager 1340

The selection manager 1320 may select an anchor point on a three-dimensional image of a face. The alignment manager 1325 may rotate the anchor point to align in a predetermined direction in three-dimensional space. The grid manager 1330 may generate on a two-dimensional plane a grid of vertices with a set resolution between each vertex. The projection manager 1335 may orthogonally project each 3D point of the three-dimensional image of the face onto the two-dimensional plane, each vertex being located within a triangle formed by the 3D points. The interpolation manager 1340 may interpolate a depth value for each vertex of the grid based on computing one or more barycentric coordinates from each triangle enclosing a vertex from the grid of vertices.

Memory 1345 may store information (e.g., facial feature information) generated by other components of the device such as image processing block 1315. For example, memory 1345 may store facial feature information with which to compare an output of image processing block 1315. Memory 1345 may comprise one or more computer-readable storage media. Examples of memory 1345 include, but are not limited to, random access memory (RAM), static RAM (SRAM), dynamic RAM (DRAM), read-only memory (ROM), electrically erasable programmable read-only memory (EEPROM), compact disc read-only memory (CD-ROM) or other optical disc storage, magnetic disc storage, or other magnetic storage devices, flash memory, or any other medium that can be used to store desired program code in the form of instructions or data structures and that can be accessed by a computer or a processor (e.g., image processing block 1315).

Figure 14:
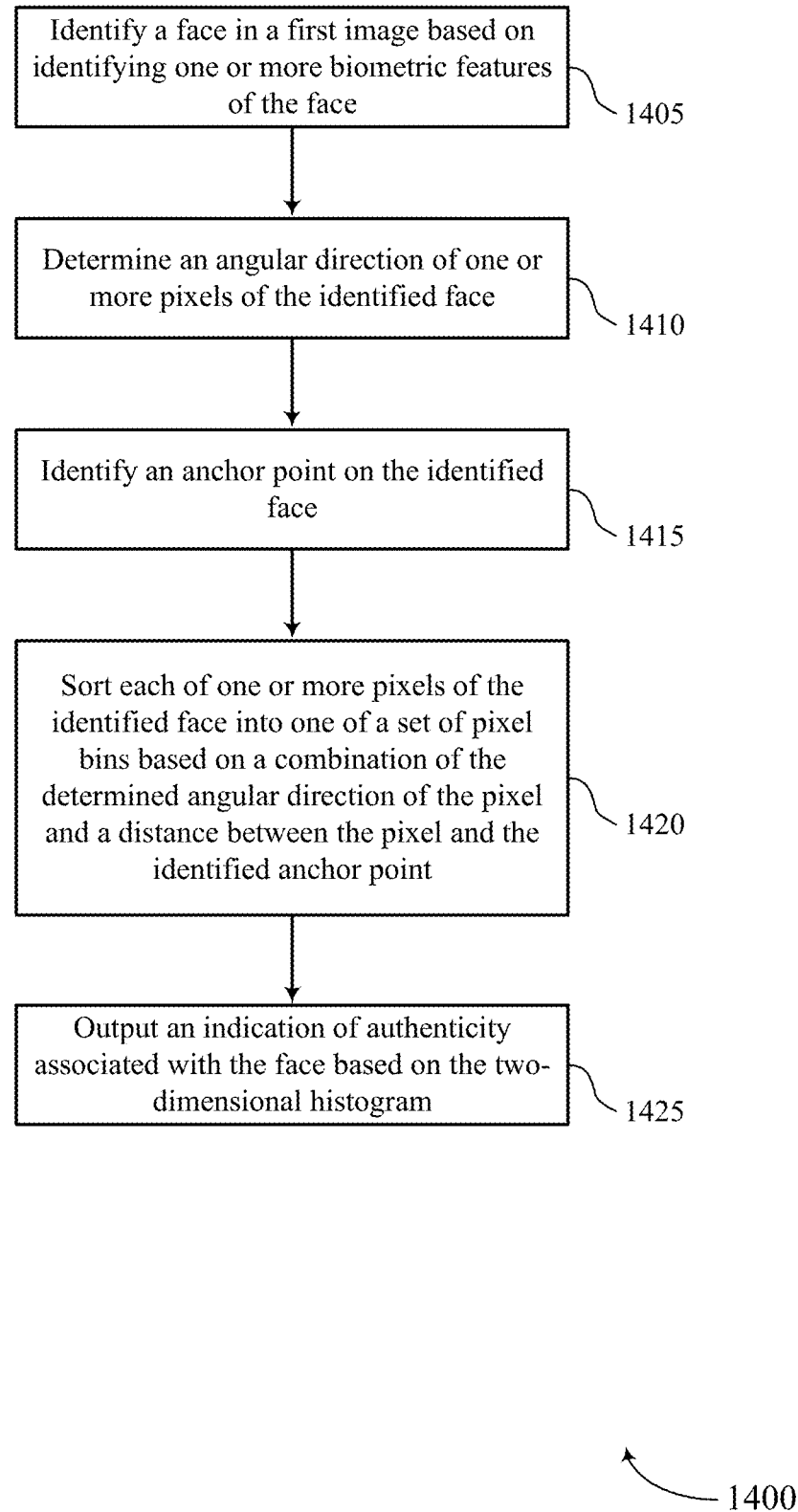
FIGS. 14 and 15 show flowcharts illustrating methods that support depth image based face anti-spoofing in accordance with aspects of the present disclosure.

FIG. 14 shows a flowchart illustrating a method 1400 that supports depth image based face anti-spoofing in accordance with aspects of the present disclosure. The operations of method 1400 may be implemented by a device or its components as described herein. For example, the operations of method 1400 may be performed by an image processing manager as described with reference to FIGS. 10 through 13. In some examples, a device may execute a set of instructions to control the functional elements of the device to perform the functions described below. Additionally or alternatively, a device may perform aspects of the functions described below using special-purpose hardware.

At 1405, the device may identify a face in a first image based on identifying one or more biometric features of the face. The operations of 1405 may be performed according to the methods described herein. In some examples, aspects of the operations of 1405 may be performed by an identification manager as described with reference to FIGS. 10 through 13.

At 1410, the device may determine an angular direction of one or more pixels of the identified face. The operations of 1410 may be performed according to the methods described herein. In some examples, aspects of the operations of 1410 may be performed by an analysis manager as described with reference to FIGS. 10 through 13.

At 1415, the device may identify an anchor point on the identified face. The operations of 1415 may be performed according to the methods described herein. In some examples, aspects of the operations of 1415 may be performed by an identification manager as described with reference to FIGS. 10 through 13.

At 1420, the device may sort each of one or more pixels of the identified face into one of a set of pixel bins based on a combination of the determined angular direction of the pixel and a distance between the pixel and the identified anchor point. The operations of 1420 may be performed according to the methods described herein. In some examples, aspects of the operations of 1420 may be performed by a binning manager as described with reference to FIGS. 10 through 13.

At 1425, the device may output an indication of authenticity associated with the face based on the two-dimensional histogram. The operations of 1425 may be performed according to the methods described herein. In some examples, aspects of the operations of 1425 may be performed by an output manager as described with reference to FIGS. 10 through 13.

Figure 15:
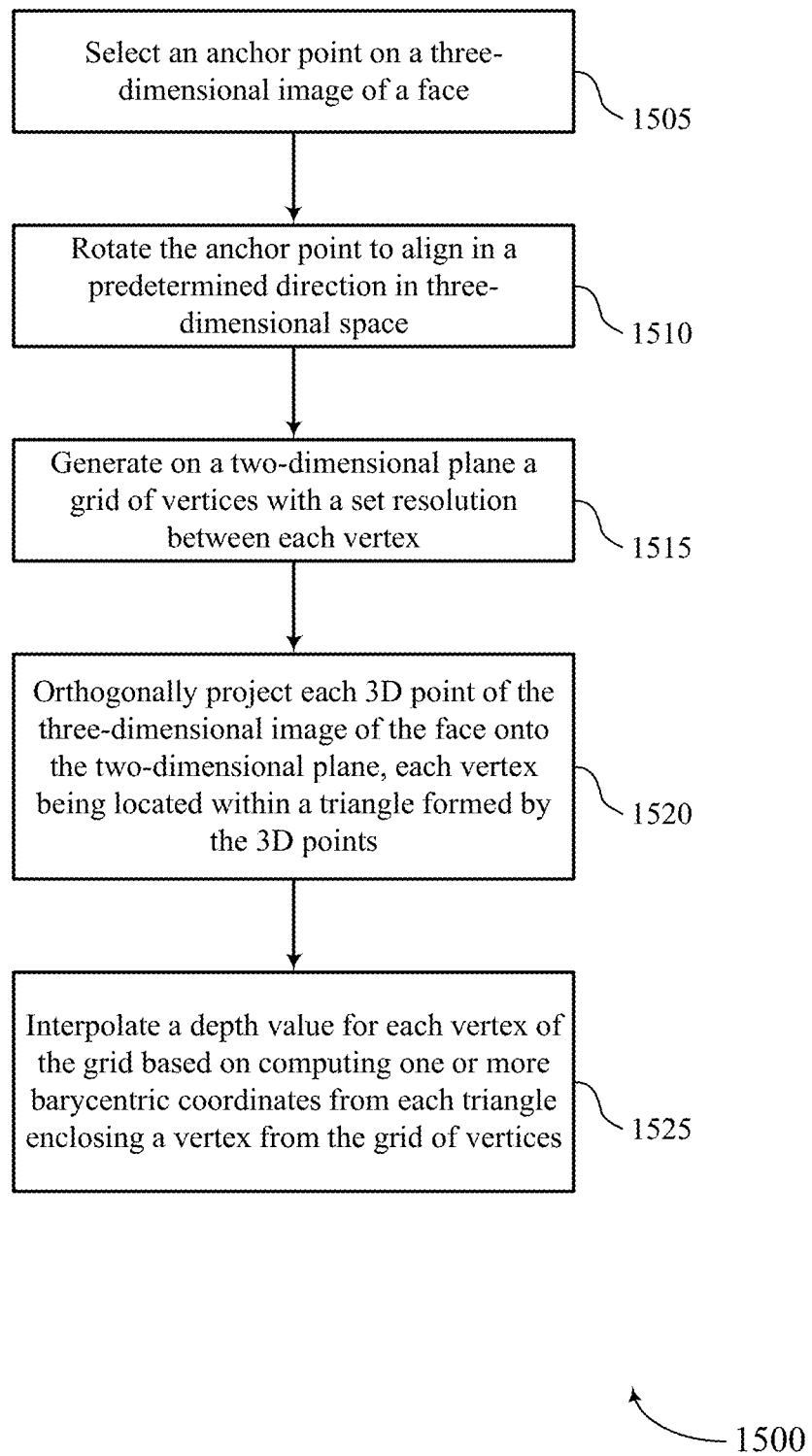

FIG. 15 shows a flowchart illustrating a method 1500 that supports depth image based face anti-spoofing in accordance with aspects of the present disclosure. The operations of method 1500 may be implemented by a device or its components as described herein. For example, the operations of method 1500 may be performed by an image processing manager as described with reference to FIGS. 10 through 13. In some examples, a device may execute a set of instructions to control the functional elements of the device to perform the functions described below. Additionally or alternatively, a device may perform aspects of the functions described below using special-purpose hardware.

At 1505, the device may select an anchor point on a three-dimensional image of a face. The operations of 1505 may be performed according to the methods described herein. In some examples, aspects of the operations of 1505 may be performed by a selection manager as described with reference to FIGS. 10 through 13.

At 1510, the device may rotate the anchor point to align in a predetermined direction in three-dimensional space. The operations of 1510 may be performed according to the methods described herein. In some examples, aspects of the operations of 1510 may be performed by an alignment manager as described with reference to FIGS. 10 through 13.

At 1515, the device may generate on a two-dimensional plane a grid of vertices with a set resolution between each vertex. The operations of 1515 may be performed according to the methods described herein. In some examples, aspects of the operations of 1515 may be performed by a grid manager as described with reference to FIGS. 10 through 13.

At 1520, the device may orthogonally project each 3D point of the three-dimensional image of the face onto the two-dimensional plane, each vertex being located within a triangle formed by the 3D points. The operations of 1520 may be performed according to the methods described herein. In some examples, aspects of the operations of 1520 may be performed by a projection manager as described with reference to FIGS. 10 through 13.

At 1525, the device may interpolate a depth value for each vertex of the grid based on computing one or more barycentric coordinates from each triangle enclosing a vertex from the grid of vertices. The operations of 1525 may be performed according to the methods described herein. In some examples, aspects of the operations of 1525 may be performed by an interpolation manager as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for image processing at a device, comprising:
    capturing, via a 3D depth camera, a first image;
    identifying a face in the first image based at least in part on identifying one or more biometric features of the face;
    determining an angular direction of one or more pixels of the identified face;
    identifying an anchor point on the identified face;
    augmenting a database of face image samples by making at least one copy of the first image, adjusting one or more aspects of the face in the at least one copy of the first image, and adding the adjusted copy of the first image to the database;
    sorting each of one or more pixels of the identified face into one of a plurality of pixel bins based at least in part on a combination of the determined angular direction of the pixel and a distance between the pixel and the identified anchor point; and
    outputting an indication of authenticity associated with the face based at least in part on a number of pixels in each bin.

2. The method of claim 1, further comprising:
    determining an angular position of the identified face in a three dimensional space, the first image comprising three dimensional image data; and
    moving the face in the three dimensional space until the anchor point is pointed in a predetermined direction in the three dimensional space.

3. The method of claim 2, further comprising:
    determining a depth of the face in the three dimensional space is not at a predetermined depth; and
    adjusting the depth of the face in the three dimensional space to be at the predetermined depth.

4. The method of claim 1, adjusting one or more aspects of the face in the at least one copy comprising:
    moving the face in the at least one copy in three-dimensional space a predetermined distance away from or toward a point of view of the 3D depth camera that captured the first image.

5. The method of claim 1, adjusting one or more aspects of the face in the at least one copy comprising:
    adding a predetermined amount of Gaussian noise to at least one pixel of the face in the at least one copy.

6. The method of claim 1, adjusting one or more aspects of the face in the at least one copy comprising:
    generating one or more patches, each patch comprising at least one black pixel; and
    placing at least one of the one or more patches randomly or in a predetermined location over a portion of the face in the at least one copy.

7. The method of claim 1, adjusting one or more aspects of the face in the at least one copy comprising:
    making the at least one copy of the first image and adjusting the one or more aspects of the face in the at least one copy of the first image when the face in the first image is determined to be an unauthentic face.

8. The method of claim 1, further comprising:
    training a machine learning model to determine whether the first image is an image of an unauthentic face or an image of an authentic face.

9. The method of claim 8, further comprising:
    receiving a second image of a face in three dimensional space;
    analyzing the second image by feeding the second image into the machine learning model; and
    determining whether the face in the second image is an authentic face or an unauthentic face based at least in part on the training of the machine learning model.

10. The method of claim 1, wherein the anchor point includes an identified feature of the face in the image, the feature including at least one of a nose, an eye, an eyebrow, a lip, a chin, a cheek, an ear, a forehead, or any combination thereof.

11. A method for image processing, comprising:
    capturing, via a 3D depth camera, a depth image;
    selecting an anchor point on a three-dimensional image of a face in the captured depth image;
    rotating the anchor point to align in a predetermined direction in three-dimensional space;
    generating on a two-dimensional plane a grid of vertices with a set resolution between each vertex;
    orthogonally projecting each 3D point of the three-dimensional image of the face onto the two-dimensional plane, each vertex being located within a triangle formed by the 3D points;
    augmenting a database of face image samples by making at least one copy of the first image, adjusting one or more aspects of the face in the at least one copy of the first image, and adding the adjusted copy of the first image to the database; and
    interpolating a depth value for each vertex of the grid based at least in part on computing one or more barycentric coordinates from each triangle enclosing a vertex from the grid of vertices.

12. An apparatus for image processing at a device, comprising:
    a processor,
    memory in electronic communication with the processor; and
    instructions stored in the memory and executable by the processor to cause the apparatus to:
        capturing, via a 3D depth camera, a first image;
        identify a face in the first image based at least in part on identifying one or more biometric features of the face;
        determine an angular direction of one or more pixels of the identified face;
        identify an anchor point on the identified face;
        augment a database of face image samples by making at least one copy of the first image, adjusting one or more aspects of the face in the at least one copy of the first image, and adding the adjusted copy of the first image to the database;

sort each of one or more pixels of the identified face into one of a plurality of pixel bins based at least in part on a combination of the determined angular direction of the pixel and a distance between the pixel and the identified anchor point; and output an indication of authenticity associated with the face based at least in part on a number of pixels in each bin.

13. The apparatus of claim 12, wherein the instructions are further executable by the processor to cause the apparatus to:

determine an angular position of the identified face in a three dimensional space, the first image comprising three dimensional image data; and move the face in the three dimensional space until the anchor point is pointed in a predetermined direction in the three dimensional space.

14. The apparatus of claim 13, wherein the instructions are further executable by the processor to cause the apparatus to:

determine a depth of the face in the three dimensional space is not at a predetermined depth; and adjust the depth of the face in the three dimensional space to be at the predetermined depth.

15. The apparatus of claim 12, wherein the instructions are further executable by the processor to cause the apparatus to:

move the face in the at least one copy in three-dimensional space a predetermined distance away from or toward a point of view of the 3D depth camera that captured the first image.

16. The apparatus of claim 12, wherein the instructions are further executable by the processor to cause the apparatus to:

add a predetermined amount of Gaussian noise to at least one pixel of the face in the at least one copy.

17. The apparatus of claim 12, wherein the instructions are further executable by the processor to cause the apparatus to:

generate one or more patches, each patch comprising at least one black pixel; and place at least one of the one or more patches randomly or in a predetermined location over a portion of the face in the at least one copy.

18. The apparatus of claim 12, wherein the instructions are further executable by the processor to cause the apparatus to:

make the at least one copy of the first image and adjusting the one or more aspects of the face in the at least one copy of the first image when the face in the first image is determined to be an unauthentic face.

\* \* \* \* \*